(12) United States Patent
Jacobs, II et al.

(10) Patent No.: US 10,401,824 B2
(45) Date of Patent: Sep. 3, 2019

(54) METHODS AND SOFTWARE FOR REDUCING MACHINING EQUIPMENT USAGE WHEN MACHINING MULTIPLE OBJECTS FROM A SINGLE WORKPIECE

(71) Applicant: The Rapid Manufacturing Group LLC, Nashua, NH (US)

(72) Inventors: James L. Jacobs, II, Amherst, NH (US); Christopher Stahl, Hudson, NH (US)

( * ) Notice: Subject to any disclaimer, the term of this patent is extended or adjusted under 35 U.S.C. 154(b) by 0 days.

(21) Appl. No.: 15/871,191

(22) Filed: Jan. 15, 2018

(65) Prior Publication Data

US 2018/0150048 A1    May 31, 2018

Related U.S. Application Data

(63) Continuation of application No. 15/487,395, filed on Apr. 13, 2017, now abandoned.

(60) Provisional application No. 62/322,275, filed on Apr. 14, 2016.

(51) Int. Cl.
*G06F 19/00* (2018.01)
*G05B 19/19* (2006.01)

(52) U.S. Cl.
CPC .... *G05B 19/19* (2013.01); *G05B 2219/31466* (2013.01); *G05B 2219/31472* (2013.01)

(58) Field of Classification Search
CPC .......... G05B 19/19; G05B 2219/31472; G05B 2219/31466
See application file for complete search history.

(56) References Cited

U.S. PATENT DOCUMENTS

| 4,495,559 A | 1/1985 | Gelatt, Jr. et al. |
| 5,117,354 A | 5/1992 | Long |
| 5,465,221 A | 11/1995 | Merat et al. |
| 5,495,430 A | 2/1996 | Matsunari et al. |
| 5,552,995 A | 9/1996 | Sebastian |
| 5,570,291 A | 10/1996 | Dudle et al. |

(Continued)

FOREIGN PATENT DOCUMENTS

| CN | 2112190 U | 8/1992 |
| WO | 154476 A2 | 8/2001 |

(Continued)

OTHER PUBLICATIONS

Defining Lead Time for APS Planning; http://t3.apptrix.com/syteline/Language/en-US/Other/Process/Defining_Lead_Time.htm [online][retrieved Mar. 31, 2017].

(Continued)

*Primary Examiner* — Michael D Masinick
(74) *Attorney, Agent, or Firm* — Caldwell Intellectual Property Law

(57) ABSTRACT

Methods for providing a workpiece computer model including a plurality of objects defined in a body of material. A temporary support frame is provided as part of a two-sided machining process in which the workpiece is partially milled from an obverse side. The machine-control instructions are also based on one or more occupying structures added to the workpiece to fill in one or more excess unoccupied regions of the workpiece that would otherwise be machined away during machining of the objects. Providing such occupying structure(s) reduces the amount of machining that needs to be performed.

19 Claims, 10 Drawing Sheets

(56) References Cited

U.S. PATENT DOCUMENTS

| | | | |
|---|---|---|---|
| 5,655,087 A | 8/1997 | Hino et al. | |
| 5,758,328 A | 5/1998 | Giovannoli | |
| 5,815,398 A * | 9/1998 | Dighe | G06Q 10/043 700/171 |
| 5,847,971 A | 12/1998 | Ladner et al. | |
| 5,870,719 A | 2/1999 | Maritzen et al. | |
| 5,937,189 A | 8/1999 | Branson et al. | |
| 6,031,535 A | 2/2000 | Barton | |
| 6,112,133 A | 8/2000 | Fishman | |
| 6,240,332 B1 * | 5/2001 | Buttrick | G05B 19/04 700/169 |
| 6,295,513 B1 | 9/2001 | Thackston | |
| 6,341,271 B1 | 1/2002 | Salvo et al. | |
| 6,343,285 B1 | 1/2002 | Tanaka et al. | |
| 6,611,725 B1 | 8/2003 | Harrison | |
| 6,647,373 B1 | 11/2003 | Calton-Foss | |
| 6,690,990 B1 * | 2/2004 | Caron | B27G 1/00 144/363 |
| 6,701,200 B1 | 3/2004 | Lukis et al. | |
| 6,750,864 B1 | 6/2004 | Anwar | |
| 6,834,312 B2 | 12/2004 | Edwards et al. | |
| 6,836,699 B2 | 12/2004 | Lukis et al. | |
| 6,859,768 B1 | 2/2005 | Wakelam et al. | |
| 6,917,847 B2 | 7/2005 | Littlejohn et al. | |
| 6,922,701 B1 | 7/2005 | Ananian et al. | |
| 7,006,084 B1 | 2/2006 | Buss et al. | |
| 7,058,465 B2 | 6/2006 | Emori et al. | |
| 7,079,990 B2 | 7/2006 | Haller et al. | |
| 7,085,687 B2 | 8/2006 | Eckenwiler et al. | |
| 7,089,082 B1 | 8/2006 | Lukis et al. | |
| 7,123,986 B2 | 10/2006 | Lukis et al. | |
| 7,134,096 B2 | 11/2006 | Brathwaite et al. | |
| 7,299,101 B2 | 11/2007 | Lukis et al. | |
| 7,305,367 B1 | 12/2007 | Hollis et al. | |
| 7,327,869 B2 | 2/2008 | Boyer | |
| 7,343,212 B1 | 3/2008 | Brearley et al. | |
| 7,359,886 B2 | 4/2008 | Sakurai et al. | |
| 7,366,643 B2 | 4/2008 | Verdura et al. | |
| 7,369,970 B2 | 5/2008 | Shimizu et al. | |
| 7,418,307 B2 | 8/2008 | Katircioglu | |
| 7,467,074 B2 | 12/2008 | Faruque et al. | |
| 7,496,487 B2 | 2/2009 | Wakelam et al. | |
| 7,496,528 B2 | 2/2009 | Lukis et al. | |
| 7,499,871 B1 | 3/2009 | McBrayer et al. | |
| 7,523,411 B2 | 4/2009 | Carlin | |
| 7,526,358 B2 | 4/2009 | Kawano et al. | |
| 7,529,650 B2 | 5/2009 | Wakelam et al. | |
| 7,565,139 B2 | 7/2009 | Neven, Sr. et al. | |
| 7,565,223 B2 | 7/2009 | Moldenhauer et al. | |
| 7,567,849 B1 | 7/2009 | Trammell et al. | |
| 7,568,155 B1 | 7/2009 | Axe et al. | |
| 7,571,166 B1 | 8/2009 | Davies et al. | |
| 7,574,339 B2 | 8/2009 | Lukis et al. | |
| 7,590,466 B2 | 9/2009 | Lukis et al. | |
| 7,590,565 B2 | 9/2009 | Ward et al. | |
| 7,603,191 B2 | 10/2009 | Gross | |
| 7,606,628 B2 | 10/2009 | Azuma | |
| 7,630,783 B2 | 12/2009 | Walls-Manning et al. | |
| 7,656,402 B2 | 2/2010 | Abraham et al. | |
| 7,689,936 B2 | 3/2010 | Rosel | |
| 7,733,339 B2 | 6/2010 | Laning et al. | |
| 7,747,469 B2 | 6/2010 | Hinman | |
| 7,748,622 B2 | 7/2010 | Schon et al. | |
| 7,761,319 B2 | 7/2010 | Gil et al. | |
| 7,822,682 B2 | 10/2010 | Arnold et al. | |
| 7,836,573 B2 | 11/2010 | Lukis et al. | |
| 7,840,443 B2 | 11/2010 | Lukis et al. | |
| 7,908,200 B2 | 3/2011 | Scott et al. | |
| 7,957,830 B2 | 6/2011 | Lukis et al. | |
| 7,979,313 B1 | 7/2011 | Baar | |
| 7,993,140 B2 | 8/2011 | Sakezles | |
| 8,000,987 B2 | 8/2011 | Hickey | |
| 8,024,207 B2 | 9/2011 | Ouimet | |
| 8,140,401 B2 | 3/2012 | Lukis et al. | |
| 8,170,946 B2 | 5/2012 | Blair et al. | |
| 8,175,933 B2 | 5/2012 | Cook, Jr. et al. | |
| 8,180,396 B2 | 5/2012 | Athsani et al. | |
| 8,209,327 B2 | 6/2012 | Danish et al. | |
| 8,239,284 B2 | 8/2012 | Lukis et al. | |
| 8,249,329 B2 | 8/2012 | Silver | |
| 8,271,118 B2 | 9/2012 | Pietsch et al. | |
| 8,275,583 B2 | 9/2012 | Devarajan et al. | |
| 8,295,971 B2 | 10/2012 | Krantz | |
| 8,417,478 B2 | 4/2013 | Gintis et al. | |
| 8,441,502 B2 | 5/2013 | Reghetti et al. | |
| 8,515,820 B2 | 8/2013 | Lopez et al. | |
| 8,554,250 B2 | 10/2013 | Linaker | |
| 8,571,298 B2 | 10/2013 | McQueen et al. | |
| 8,595,171 B2 | 11/2013 | Qu | |
| 8,700,185 B2 | 4/2014 | Yucel et al. | |
| 8,706,607 B2 | 4/2014 | Sheth et al. | |
| 8,768,651 B2 | 7/2014 | Bhaskaran et al. | |
| 8,798,324 B2 | 8/2014 | Conradt | |
| 8,806,398 B2 | 8/2014 | Brathwaite et al. | |
| 8,830,267 B2 | 9/2014 | Brackney | |
| 8,849,636 B2 | 9/2014 | Becker et al. | |
| 8,861,005 B2 | 10/2014 | Grosz | |
| 8,874,413 B2 | 10/2014 | Mulligan et al. | |
| 8,923,650 B2 | 12/2014 | Wexler | |
| 8,977,558 B2 | 3/2015 | Nielsen et al. | |
| 9,037,692 B2 | 5/2015 | Ferris | |
| 9,046,881 B2 * | 6/2015 | Blevins | G05B 17/02 |
| 9,055,120 B1 | 6/2015 | Firman | |
| 9,106,764 B2 | 8/2015 | Chan et al. | |
| 2001/0023418 A1 | 9/2001 | Suzuki et al. | |
| 2001/0047251 A1 | 11/2001 | Kemp | |
| 2002/0065790 A1 | 5/2002 | Oouchi | |
| 2002/0087440 A1 | 7/2002 | Blair et al. | |
| 2002/0099579 A1 | 7/2002 | Stowell et al. | |
| 2002/0107673 A1 | 8/2002 | Haller et al. | |
| 2002/0152133 A1 | 10/2002 | King et al. | |
| 2003/0018490 A1 | 1/2003 | Magers et al. | |
| 2003/0069824 A1 | 4/2003 | Menninger | |
| 2003/0078846 A1 | 4/2003 | Burk et al. | |
| 2003/0139995 A1 | 7/2003 | Farley | |
| 2003/0149500 A1 | 8/2003 | Faruque et al. | |
| 2003/0163212 A1 | 8/2003 | Smith et al. | |
| 2003/0172008 A1 | 9/2003 | Hage et al. | |
| 2003/0212610 A1 | 11/2003 | Duffy et al. | |
| 2003/0220911 A1 | 11/2003 | Tompras | |
| 2004/0008876 A1 | 1/2004 | Lure | |
| 2004/0113945 A1 | 6/2004 | Park et al. | |
| 2004/0195224 A1 | 10/2004 | Kanodia et al. | |
| 2005/0055299 A1 | 3/2005 | Chambers et al. | |
| 2005/0125092 A1 | 6/2005 | Lukis et al. | |
| 2005/0144033 A1 | 6/2005 | Vreeke et al. | |
| 2005/0171790 A1 | 8/2005 | Blackmon | |
| 2005/0251478 A1 | 11/2005 | Yanavi | |
| 2005/0273401 A1 | 12/2005 | Yeh et al. | |
| 2006/0085322 A1 | 4/2006 | Crookshanks | |
| 2006/0185275 A1 | 8/2006 | Yatt | |
| 2006/0253214 A1 | 11/2006 | Gross | |
| 2007/0016437 A1 | 1/2007 | Elmufdi et al. | |
| 2007/0067146 A1 | 3/2007 | Devarajan et al. | |
| 2007/0073593 A1 | 5/2007 | Perry et al. | |
| 2007/0112635 A1 | 5/2007 | Loncaric | |
| 2007/0198231 A1 | 8/2007 | Walch | |
| 2008/0120086 A1 | 5/2008 | Lilley et al. | |
| 2008/0183614 A1 | 7/2008 | Gujral et al. | |
| 2008/0269942 A1 | 10/2008 | Free | |
| 2008/0281678 A1 | 11/2008 | Keuls et al. | |
| 2009/0058860 A1 | 3/2009 | Fong et al. | |
| 2009/0208773 A1 | 8/2009 | DuPont | |
| 2009/0299799 A1 | 12/2009 | Racho et al. | |
| 2009/0319388 A1 | 12/2009 | Yuan et al. | |
| 2010/0000677 A1 * | 1/2010 | Guggenmos | A61C 13/0022 156/295 |
| 2011/0040542 A1 | 2/2011 | Sendhoff et al. | |
| 2011/0047140 A1 | 2/2011 | Free | |
| 2011/0209081 A1 | 8/2011 | Chen et al. | |
| 2011/0213757 A1 | 9/2011 | Bhaskaran et al. | |
| 2012/0016678 A1 | 1/2012 | Gruber et al. | |
| 2012/0072299 A1 | 3/2012 | Sampsell | |
| 2012/0230548 A1 | 9/2012 | Calman et al. | |

(56) References Cited

U.S. PATENT DOCUMENTS

| | | |
|---|---|---|
| 2012/0316667 A1 | 12/2012 | Hartloff |
| 2013/0055126 A1 | 2/2013 | Jackson |
| 2013/0097259 A1 | 4/2013 | Li |
| 2013/0100128 A1 | 4/2013 | Steedly et al. |
| 2013/0138529 A1 | 5/2013 | Hou |
| 2013/0144566 A1 | 6/2013 | De Biswas |
| 2013/0166470 A1 | 6/2013 | Grala et al. |
| 2013/0218961 A1 | 8/2013 | Ho |
| 2013/0293580 A1 | 11/2013 | Spivack |
| 2013/0297320 A1 | 11/2013 | Buser |
| 2013/0297460 A1 | 11/2013 | Spivack |
| 2013/0311914 A1 | 11/2013 | Daily |
| 2013/0325410 A1 | 12/2013 | Jung et al. |
| 2014/0042136 A1 | 2/2014 | Daniel et al. |
| 2014/0067333 A1 | 3/2014 | Rodney et al. |
| 2014/0075342 A1 | 3/2014 | Corlett |
| 2014/0098094 A1 | 4/2014 | Neumann et al. |
| 2014/0157579 A1 | 6/2014 | Chhabra et al. |
| 2014/0207605 A1 | 7/2014 | Allin et al. |
| 2014/0229316 A1 | 8/2014 | Brandon |
| 2014/0279177 A1 | 9/2014 | Stump |
| 2014/0379119 A1 | 12/2014 | Sciacchitano et al. |
| 2015/0055085 A1 | 2/2015 | Fonte et al. |
| 2015/0066189 A1 | 3/2015 | Mulligan et al. |
| 2015/0127480 A1 | 5/2015 | Herrman et al. |
| 2015/0234377 A1 | 8/2015 | Mizikovsky |

FOREIGN PATENT DOCUMENTS

| | | |
|---|---|---|
| WO | 171626 A2 | 9/2001 |
| WO | 2001077781 A2 | 10/2001 |
| WO | 2006086332 A2 | 8/2006 |
| WO | 2007067248 A2 | 6/2007 |
| WO | 2011139630 A1 | 11/2011 |
| WO | 2011140646 | 11/2011 |
| WO | 2013058764 A1 | 4/2013 |
| WO | 2014152396 A2 | 9/2014 |

OTHER PUBLICATIONS

"Quartiles." Mathisfun.com. Web. <https://www.mathsisfun.com/data/quartiles.html>. Archive. <https://web.archive.org/web/20170313183511/https://www.mathsisfun.com/data/quartiles.html> [online] [retrieved Mar. 31, 2017].

Wu et al. Interactive 3D Geometric Modelers with 2D UI, 2002, State University of Campinas, www.dca.fee.unicamp.br, Sao Paulo, Brazil; 2002, 8 pages.

"Upload Your Photos, Print a 3D Model with hypr3D." SolidSmack. http://www.solidsmack.com/cad-design-news/hypr3d-photo-video-3d-print/; last accessed on Oct. 13, 2015.

"123D Catch." Autodesk. http://apps.123dapp.com/catch/ [online] [retrieved Mar. 31, 2017].

Rothganger et al. "3D Object Modeling and Recognition from Photographs and Image Sequences." Toward Category-Level Object Recognition. 2006, pp. 105-126, vol. 4170 of the series Lecture Notes in Computer Science. Springer Berlin Heidelberg.

Dealer Information Systems Corporation. "Parts Inventory." http://dis-corp.com/content/agriculture/inventory/parts-inventory. [online] [retrieved Mar. 31, 2017].

eMachineShop. "Emachineshop Features." http://www.emachineshop.com/machine-shop/Features/page518.html. [online] [retrieved Mar. 31, 2017].

Retrieved from:http://www.solidworks.com/sw/products/3d-cad/manufacturing-cost-estimation-quoting.htm p. 1: Automatic Manufacturing Cost Estimation Overview; Solidworks; 2015.

Retrieved from: http://www.gom.com/fileadmin/user_upload/industries/touch_probe_fixtures_EN.pdf; Application Example: Quality Control, Online Calibration and Validation of Fixtures, Jigs and Gauges. GOM mbH, 2008.

http://citeseerx.ist.psu.edu/viewdoc/download?doi=10.1.1.194.7785&rep=rep1&type=pdf Kim, Jin Baek, and Arie Segev. "A web services-enabled marketplace architecture for negotiation process management." Decision Support Systems 40.1 (2005): 71-87.

Jaiswal, Ashutosh et al., "Design and Implementation of a Secure Multi-Agent Marketplace", Elsevier Science, pp. 1-23, Jun. 3, 2004; http://magnet.cs.umn.edu/papers/Jaiswal04cera.pdf.

http://www.computer.org/csdl/proceedings/hicss/2005/2268/01/22680038.pdf Bui, Tung, and Alexandre Gachet. "Web services for negotiation and bargaining in electronic markets: Design requirements and implementation framework." System Sciences, 2005. HICSS'05. Proceedings of the 38th Annual Hawaii International Conference on. IEEE, 2005.

http://www.bridgelinedigital.com/File%20Library/Repository/eCommerce/Sample-eCommerce-RFP-Template_Bridgeline-Digital.pdf. Sample RFP Template: Ecommerce Platform, Bridgeline Digital, 2014.

Matchbook, Tealbook, http://www.matchbookinc.com/ Sep. 28, 2015.

3Diligent, Source Smarter, http://www.3diligent.com/customer.html; Sep. 28, 2015.

Dassault Systemes, Brochure, Mar. 24, 2010: New Features Type3ToCatia http://www.type3.us/content/download/2202/405535/file/New%20Feature_Type3ToCatia_2010_US%20old.pdf.

Xue, S., X. Y. Kou, and S. T. Tan. "Natural voice-enabled CAD: modeling via natural discourse." Computer-Aided Design and Applications 6.1 (2009): 125-136.

Kou, X. Y., S. K. Xue, and S. T. Tan. "Knowledge-guided inference for voice-enabled CAD." Computer-Aided Design 42.6 (2010): 545-557.

Sharma, Anirudh, et al. "MozArt: a multimodal interface for conceptual 3D modeling." Proceedings of the 13th international conference on multimodal interfaces. ACM, 2011.

Sorpas ("User Manual,", Swanted Software and Engineering Aps, 2011 (120 pages)).

Kalpakjian, S. and Schmid, S., *Manufacturing Processes for Engineering Materials*, 5$^{th}$ Ed. Pearson (Jul. 27, 2007).

Wang and Bourne, *Design and Manufacturing of Sheet Metal Parts: Using Features to Aid Process Planning and Resolve Manufacturability Problems*, Robotics and Computer-Integrated Manufacturing, vol. 13, No. 3, pp. 281-294 (1997).

U.S. Appl. No. 14/267,447, Aug. 5, 2015, Office Action.
U.S. Appl. No. 14/197,922, Nov. 26, 2014, Office Action.
U.S. Appl. No. 14/197,922, Apr. 27, 2015, Response to Office Action.
U.S. Appl. No. 14/197,922, May 15, 2015, Office Action.
U.S. Appl. No. 14/267,447, Jun. 18, 2015, Response to Office Action.
U.S. Appl. No. 14/263,665, Oct. 8, 2015, Office Action.
U.S. Appl. No. 14/053,222, Jan. 29, 2016, Office Action, U.S. Pat. No. 9,606,701.
U.S. Appl. No. 14/311,943, Apr. 27, 2016, Office Action.
U.S. Appl. No. 14/486,550, May 26, 2016, Office Action.
U.S. Appl. No. 14/060,033, Jun. 15, 2016, Office Action.
U.S. Appl. No. 14/172,462, Jul. 6, 2016, Office Action.
U.S. Appl. No. 14/053,222, Jul. 29, 2016, Response to Office Action.
U.S. Appl. No. 14/185,204, Jul. 29, 2016, Office Action.
U.S. Appl. No. 14/062,947, Sep. 16, 2016, Office Action.
U.S. Appl. No. 14/457,758, Sep. 30, 2016, Office Action.
U.S. Appl. No. 14/457,758, Mar. 29, 2017, Response to Office Action.
U.S. Appl. No. 14/195,391, Oct. 18, 2017, Office Action.
U.S. Appl. No. 14/172,404, Oct. 20, 2017, Office Action.
U.S. Appl. No. 14/275,116, Dec. 28, 2016, Office Action.
U.S. Appl. No. 14/303,372, Jan. 11, 2017, Office Action.
U.S. Appl. No. 14/246,254, Jan. 11, 2017, Office Action.
U.S. Appl. No. 14/229,008, Jan. 13, 2017, Office Action.
U.S. Appl. No. 14/060,033, filed Oct. 22, 2013.
U.S. Appl. No. 14/053,222, filed Oct. 14, 2013, U.S. Pat. No. 9,606,701.
U.S. Appl. No. 14/172,462, filed Oct. 16, 2013.
U.S. Appl. No. 14/062,947, filed Oct. 25, 2013.
U.S. Appl. No. 14/172,404, filed Feb. 4, 2014.
U.S. Appl. No. 14/303,372, filed Jun. 12, 2014.
U.S. Appl. No. 14/185,204, filed Feb. 20, 2014.

(56) References Cited

OTHER PUBLICATIONS

U.S. Appl. No. 14/195,391, filed Mar. 3, 2014.
U.S. Appl. No. 14/246,254, filed Apr. 7, 2014.
U.S. Appl. No. 14/229,008, filed Mar. 28, 2014.
U.S. Appl. No. 14/197,922, filed Mar. 5, 2014.
U.S. Appl. No. 14/263,665, filed Apr. 28, 2014.
U.S. Appl. No. 14/267,447, filed May 1, 2014.
U.S. Appl. No. 14/311,943, filed Jun. 23, 2014.

* cited by examiner

METHODS AND SOFTWARE FOR REDUCING MACHINING EQUIPMENT USAGE WHEN MACHINING MULTIPLE OBJECTS FROM A SINGLE WORKPIECE

RELATED APPLICATION DATA

This application claims the benefit of priority of U.S. Non-provisional application Ser. No. 15/487,395, filed on Apr. 13, 2017, and entitled "METHODS AND SOFTWARE FOR REDUCING MACHINING EQUIPMENT USAGE WHEN MACHINING MULTIPLE OBJECTS FROM A SINGLE WORKPIECE," which claims the benefit of U.S. Provisional Patent Application Ser. No. 62/322,275, filed on Apr. 14, 2016, and titled "METHODS AND SOFTWARE FOR REDUCING MACHINING EQUIPMENT USAGE WHEN MACHINING MULTIPLE OBJECTS FROM A SINGLE WORKPIECE." Each of U.S. Non-provisional application Ser. No. 15/487,395 and U.S. Provisional Patent Application Ser. No. 62/322,275 is incorporated herein by reference in its entirety.

FIELD OF THE INVENTION

The present invention generally relates to the field of machining. In particular, the present invention is directed to methods and software for reducing machining equipment usage when machining multiple objects from a single workpiece.

BACKGROUND

Many types of objects are manufactured using rotary-tool milling and other types of subtractive manufacturing processes. Typically, a single object is made from a single body of material, or "workpiece," such as a block or slab of steel or aluminum. For example, steel and aluminum parts for any of a wide variety of assemblies are often machined from individual workpieces using one or more milling machines. However, making such machined parts can be labor intensive as operators load and unload individual workpieces to and from milling machines.

SUMMARY OF THE DISCLOSURE

A method of providing a workpiece computer model including a plurality of objects defined in a body of material, the method comprising: receiving, a graphical representation of a temporary support frame to be machined from the body of material, wherein the graphical representation of the temporary support frame includes: first and second surfaces spaced from one another; and an opening for receiving graphical representations of computer models of the plurality of objects, the opening extending from the first side to the second side; receiving a selection of the graphical representations of the plurality of objects to be machined from the workpiece; locating the graphical representations of the plurality of objects in the opening so that the graphical representations of the plurality of objects are spaced from one another and from the graphical representation of the temporary support frame so as to permit machining of the plurality of objects; receiving an identification of one or more excess unoccupied regions within the opening after the locating of the graphical representations of the plurality of objects; and for each excess unoccupied region, generating a graphical representation of an occupying structure occupying at least one of the one or more excess unoccupied regions; and generating a workpiece computer model including a plurality of objects defined in a body of material.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In one aspect, the present invention is directed to methods of reducing machining equipment usage during manufacturing of a plurality of discrete objects from a single body of material, or "workpiece." As described below in detail, in these methods a temporary support frame is provided, for example, to aid in handling, datum referencing, and/or object layout, among other things. Examples of discrete objects that can be manufactured using techniques disclosed herein include, but are not limited to, finished parts for assemblies (such as consumer products, military equipment, commercial equipment, among others), precursors to finished parts (such as precursors that required further processing to create finished assembly parts), finished standalone products, and precursors to finished standalone products, among others. Generally, the only limitations on the nature and character of the discrete objects is that they are manufactureable by one or more subtractive manufacturing processes and are compatible with other steps of processes described below. It is noted that for any given workpiece, the multiple discrete parts may all be identical to one another or they may all be different from one another or some may be identical and others may be different. As used herein and in the appended claims, a "precursor" to a finished part or finished object is a discrete object, i.e., an object liberated from the body of material from which it is made, that requires further processing to become the finished part or finished object.

Figure 1A:
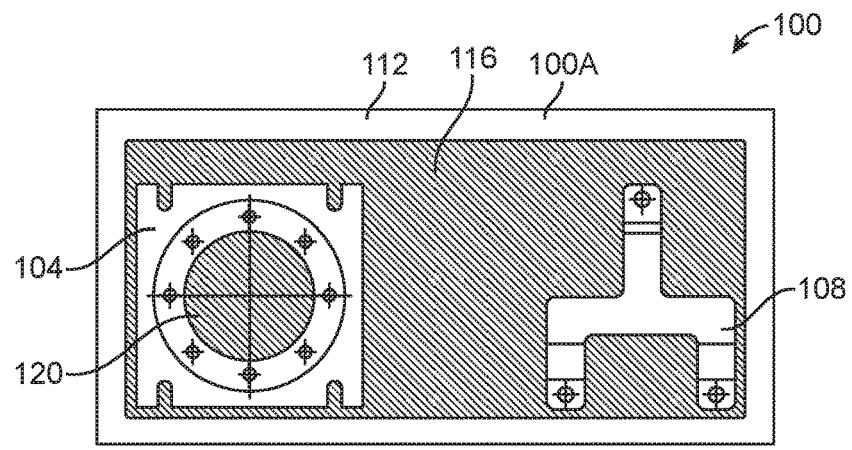
FIG. 1A is a plan view of a first workpiece for creating two objects using a temporary support frame, illustrating expanses of excess unoccupied regions of a workpiece that are machined away during machining used to form the two objects.
Figure 1B:
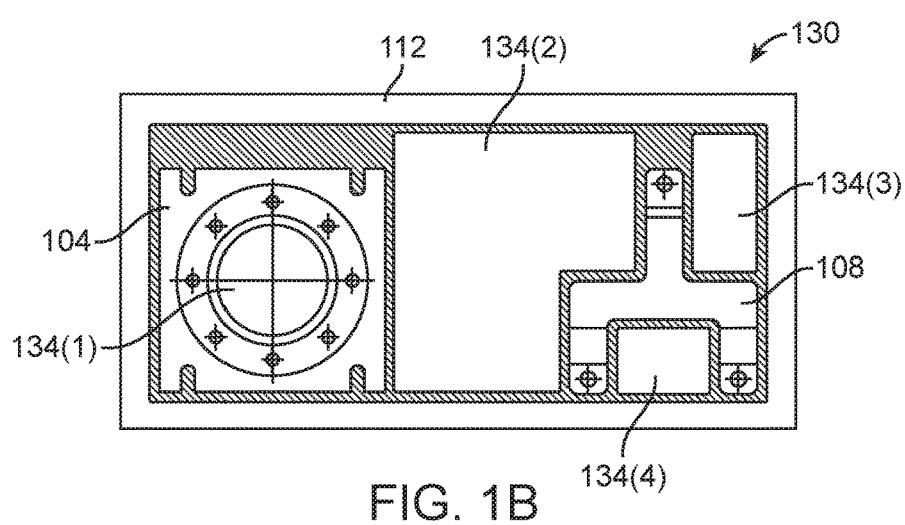
FIG. 1B is a plan view of a second workpiece for creating the same two objects of FIG. 1A but providing occupying structures that occupy excess unoccupied regions of the workpiece to reduce the amount of machining required to form the two objects.
Figure 1C:
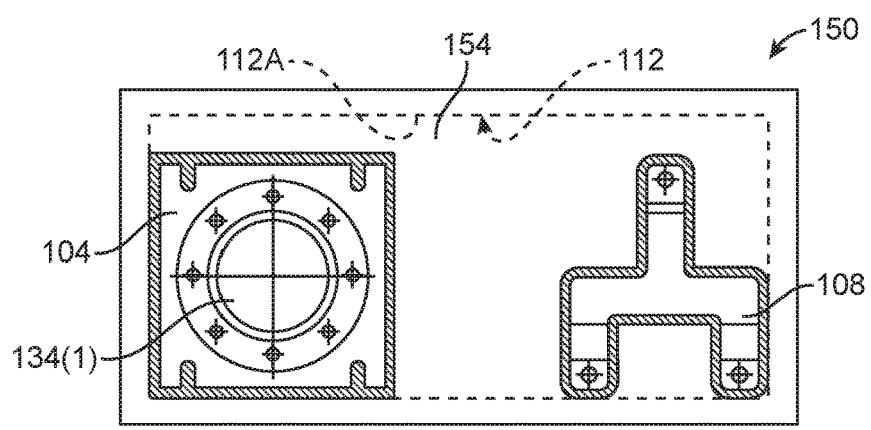
FIG. 1C is a plan view of a third workpiece for creating the same two objects of FIGS. 1A and 1B but providing highly optimized occupying structures that occupy substantially all excess unoccupied regions of the workpiece to minimize the amount of machining required to form the two objects.

FIGS. 1A to 1C illustrate aspects of the present invention that result in savings of machining time, machining equipment wear, and cost of machining a given set of objects. FIG. 1A illustrates a first workpiece 100 after machining from the obverse side 100A of the first workpiece to create a first object 104 and a second object 108 from the same body of material. In this example, a result of the machining also forms a temporary support frame 112 that is used at certain steps of the machining process to stabilize the first and second objects.

As described in more detail below, to create first workpiece 100, it is first modeled with computer-modeling software using graphical representations of temporary support frame 112 and graphical representations of first and second objects 104 and 108. The graphical representation of temporary support frame 112 is used as a starting point for arranging the objects (here, first and second objects 104 and 108) within the workpiece. This is done by locating graphical representations of the objects, here, first and second objects 104 and 108, within an opening of the graphical representation of temporary support frame 112. It is noted that an opening of the graphical representation of temporary support frame 112 may be centrally located. It is further noted that an opening may be a through-opening of the graphical representation of temporary support frame. Additionally, and alternatively, an opening of the graphical representation of temporary support frame 112 may be a recess. Specifically, and to avoid confusion, a recess may not be an opening and may be a recess that may be located within a graphical representation of temporary support frame 112. A recess may be of any appropriate depth. A person of ordinary skill in the art will readily appreciate after reading this disclosure in its entirety that depending on variables, like the type of first object 104 or second object 108, that any number of recess depths may be desired and easily incorporated into the innovation of the current disclosure. An opening and a recess, or an opening or a recess, and any appropriate number of each may be included in a graphical representation of temporary support frame 112. Again, a person of ordinary skill in the art will readily appreciate the number of different configurations possible. Herein, the term opening may be used interchangeably with recess. Since temporary support frame 112 and first and second objects 104 and 108 are the only structures to be made from workpiece 100, when the workpiece is machined to create these structures, all of the material of the workpiece not part of these structures is machined away, here creating void 116 and void 120 (which are parts of the opening of the temporary support frame. Machining away that much material is time consuming and costly.

FIG. 1B illustrates a second workpiece 130 for making the same first and second objects 104 and 108. Like first workpiece 100, second workpiece 130 includes frame 112 and first and second objects 104 and 108. However, to reduce the amount of machining needed to create these structures, second workpiece 130 includes a set of four occupying structures 134(1) to 134(4) that occupy what are referred to herein and in the appended claims as "excess unoccupied regions," which are regions outside the silhouettes (see FIGS. 3A-3C and accompanying descriptions for silhouetting features) of first and second objects 104 and 108 and temporary support frame 112 that do not need to be machined away in order to form the first and second objects. In this example, occupying structures 134(1) to 134(4) are defined in computer-modeling software by corresponding graphical representations that are essentially added to the graphical representations of temporary support frame 112 and first and second objects 104 and 108. The graphical representations of occupying structures 134(1) to 134(4) are then considered in the creation of the machine-control instruction set as structures to be machined from second workpiece 130 along with temporary support frame 112 and first and second objects 104 and 108. As can be readily appreciated, not having to machine away material from second workpiece 130 in the regions of occupying structures 134(1) to 134(4) significantly reduced the machining usage needed to create first and second objects 104 and 108. For example, it generally takes a certain amount of time to machine a certain amount of volume from a workpiece and by reducing the volume to be machined you reduce the amount of time it takes to machine an object. After completion of machining operations, occupying structures 134(1) to 134(4) can be recycled, as can be temporary support frame 112. As can be seen in FIG. 1B, occupying structures 134(1) to 134(4) are simple geometric shapes that approximate the shapes of the corresponding excess unoccupied regions. In other instances, occupying structures may be complex geometric shapes following the contouring of non-rectilinear parts. As described below in detail, occupying structures 134(1) to 134(4) can be modeled manually by a user or automatically by a suitably capable workpiece-layout system.

FIG. 1C takes the occupying-structure feature to an extreme with a third workpiece 150 that is also defined to create first and second objects 104 and 108. In FIG. 1C, third workpiece 150 is defined to nearly completely minimize the amount of material that needs to be machined away to create first and second objects 104 and 108 by largely outlining the first and second objects with a gap that is based on the machine tool(s) plus an offset, if any, that is(are) used during the machining of the third workpiece, leaving everything beyond that gap outside the first and second objects untouched by the machining. It is noted that in the creation of third workpiece 150, a graphical representation of temporary support frame 112 (FIGS. 1A and 1B and shown via dashed lines in FIG. 1C) is initially in the model of the third workpiece as it is with first and second workpieces 100 and 130 of FIGS. 1A and 1B. However, during the creation of the occupying structure 154 in the computer model of third workpiece 150, the occupying structure is created in such a way that it is effectively an inward extension of temporary support frame 112 to a point that the originally inner periphery 112A of the temporary support frame morphs to surround first and second objects 104 and 108 and be spaced therefrom by the gap described above. In this example, third workpiece 150 of FIG. 1C also includes occupying structure 134(1) also present in second workpiece 130 of FIG. 1B within an interior region of second object 108. Though not illustrated, in some instantiations excess unoccupied regions and corresponding occupying structures can be located between a pair of objects or among a group of three or more objects, depending on the shape(s) of the objects, their orientations relative to one another, the number of objects, and their locations relative to one another. As with second workpiece 130 of FIG. 1B, the computer model for third workpiece 150 of FIG. 1C can be created manually or automatically, depending on the functionality of the modeling software used. In addition to the description provided above, and as will be appreciated after reading this disclosure in its entirety, the x, y, and z contours of any object can be defined to minimize the amount of material that needs to be machined away. For example, although only the x and y contours appear to be defined in FIGS. 1A-1C, a person of skill in the art after reading this disclosure in its entirety will readily appreciate that the z contours of an object may also be defined to reduce the volume to be machined, which will in-turn reduce the amount of machining time.

Examples of bodies of material from which the multiple discrete objects can be made include, but are not limited to, plates, slabs, blooms, billets, boards, blocks, among many other shapes, including curvilinear and multisided shapes, and any combination thereof. As for the material composing the body, the material may be any suitable material, such as metal (solid, sintered, etc.), polymer (solid, foamed, etc.), wood, composite, and multilayer material, among others. Fundamentally, there is no limitation on the composition of the body of material other than it be compatible with the selected subtractive manufacturing process(es).

Each machining process used may be any suitable process, such as, but not limited to, rotary-tool milling, electronic discharge machining, ablation, etching, erosion, cutting, and cleaving, among others. Fundamentally, there is no limitation on the type of subtractive manufacturing process(es) used other than each is compatible with composition of the body of material, depending on when a particular subtractive manufacturing process is used in the overall method.

If rotary-tool milling is utilized, this milling may be accomplished using any suitable type of milling equipment, such as milling equipment having either a vertically or horizontally oriented spindle shaft(s). Examples of milling equipment include bed mills, turret mills, C-frame mills, floor mills, gantry mills, knee mills, and ram-type mills, among others. In some embodiments, the milling equipment used for removing material may be of the computerized numerical control (CNC) type that is automated and operates by precisely programmed commands that control movement of one or more parts of the equipment to effect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms.

Figure 2:
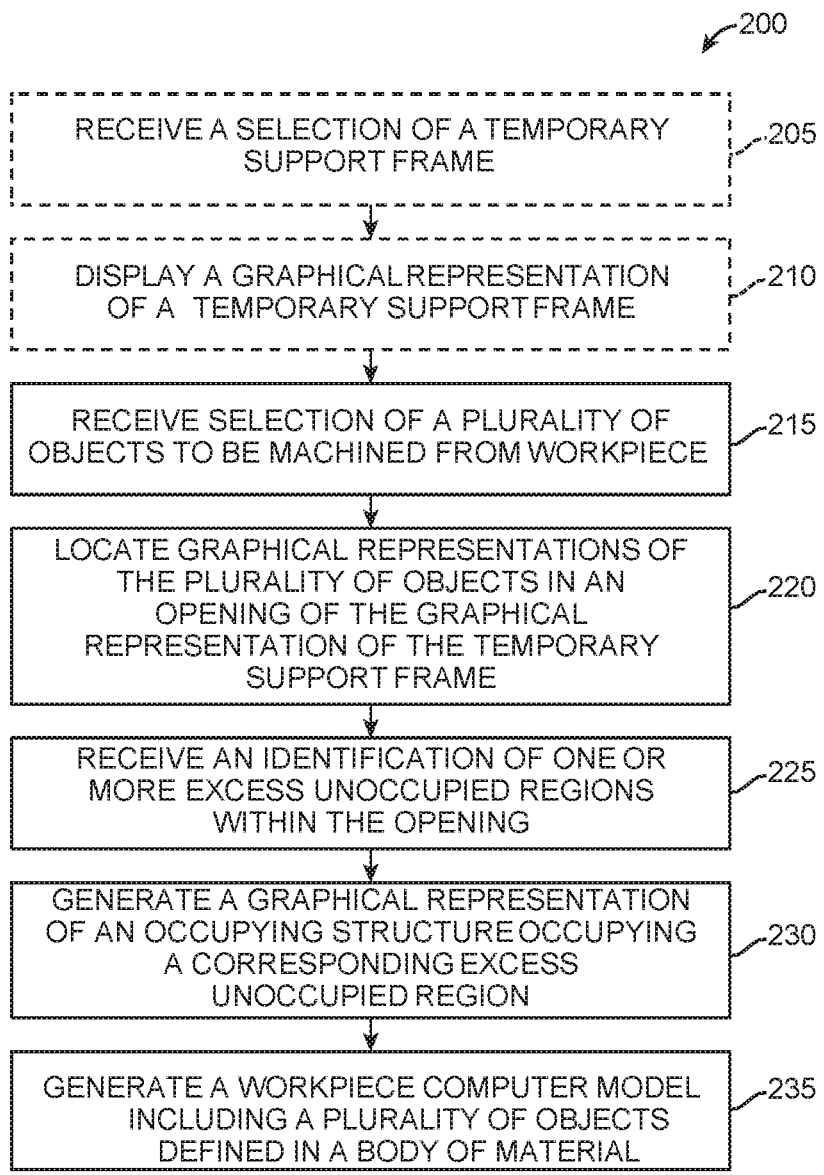
FIG. 2 is a flow diagram of an exemplary method of generating a workpiece computer model including a plurality of objects defined in a body of material.

Methods disclosed herein include methods of providing a workpiece computer model of a plurality of objects defined in a body of material. A workpiece computer model may include machine-control instruction sets, for example, numerical control (NC) instructions sets, for controlling machining equipment to machine a plurality of objects from a single workpiece in an efficient manner that seeks to minimize the amount of machining that needs to be performed, thereby reducing the wear on the machine and machine tools, and time needed to complete machining the workpiece. FIG. 2 illustrates a method 200, which is an example of such methods. As will be understood from reading this entire disclosure, aspects of some of the methods described herein, including method 200, may be performed by a workpiece-layout system that runs computer software, such as CAD software and software for generating machine-control instructions sets from CAD models and/or other types of computer models of objects to be fabricated using the machine-control instructions provided by these methods. Such a workpiece-layout system can comprise any suitable computing system, including standalone computing systems and networked computing systems that can run conventional CAD software, CAM software, and the like. As alluded to above, the term "machine-control instructions" and like terms are used herein and in the appended claims to denote any instruction set needed to control any one or more types of machining equipment to perform the necessary machining and, as appropriate, any additional machine-control instructions for performing non-machining operations, such as controlling any robotic manipulator(s) and/or other equipment that automatically moves a workpiece before, during, or after machining operations.

Referring now to FIG. 2, exemplary method 200 includes a step 205 at which the workpiece-layout system may receive at the workpiece-layout system, a graphical representation of a temporary support frame that is to be machined from the body of material (or, again, "workpiece"), along with the discrete objects that are the subjects of the machining. It is emphasized that step 205 is exemplary and that exemplary method 200 may proceed without receiving a graphical representation of a temporary support frame. In an embodiment, rather than receive a graphical representation of a temporary support frame, the graphical representation of the temporary support frame may be displayed. Continuing with this example, it is noted that this method may be automated entirely or certain steps may be automated and that the method may or may not include interaction by a user. After reading this disclosure in its entirety, a person of ordinary skill in the art will readily appreciate the circumstances where an automated system may be desirable. The temporary support frame in this example may be used as part of an object-stabilizing scheme for holding the objects and their partially machined precursors in place.

The temporary support frame may include an opening, defined by its inner periphery, that, after machining the workpiece from its first and second sides to create the discrete objects and temporary support frame, contains the discrete objects. In some embodiments in which the temporary support frame is rectangular in shape, it generally resembles a picture frame, with an opening being the region defined by the inner perimeter of the frame and its thickness. Examples of temporary support frames are depicted in various figures of the attached drawings.

In some embodiments, the workpiece-layout system may include a temporary-support-frame library containing graphical representations for multiple temporary support frames of differing sizes and/or thicknesses, wherein the multiple temporary support frames are configured for specific bodies of materials. For example, a graphical representation of one temporary support frame may correspond to a stock piece of stainless steel that is 24.02"×18.02"×1". In this case, the temporary support frame may be 24"×18"× 0.75" to account for, for example, aspects of the two-part machining of the first and second sides of the workpiece. As another example, a graphical representation for another temporary support frame may correspond to a stock piece of aluminum that is 36.02"×24.02"×3", and this temporary support frame may be 36"×24"×2.75". These examples are merely illustrative; fundamentally there is no limitation on the differing graphical representations of temporary support frames that can be provided in a temporary-support-frame library of the present disclosure.

If the workpiece-layout system includes a temporary-support-frame library containing two or more graphical representations of differing temporary support frames, the workpiece-layout system may receive a selection of that graphical representation from the temporary-support-frame library (not shown). This selection may be accomplished in any one or more of a variety of ways, such as by user selection via a dialog box that displays either the multiple graphical representations of the differing temporary support frames or corresponding descriptors or filenames and allowing a user to select the desired one, allowing the user to drag and drop the desired graphical representation, or allowing the user to select the desired body of material and automatically selecting the corresponding graphical representation of the pertinent temporary support frame for the selected body of material, among others. In the case of the last-mentioned option, such selection of the body of material can also be enabled in any one or more of a variety of ways, including via a dialog box that may displays either the multiple graphical representations of the differing available bodies of material or corresponding descriptors or filenames and allowing a user to select the desired one, among others. In embodiments of the workpiece-layout system not having an interactive temporary support frame library, the user may retrieve the graphical representation of the temporary support frame in any suitable manner, such as by receiving an identification of a computer-model file in an onscreen dialog box, dragging and dropping the graphical representation from one onscreen window to another onscreen window, copying and pasting the graphical representation from one onscreen window to another onscreen window, and any combination of these ways. At optional step 210, a graphical representation of a temporary support frame may be displayed. In an embodiment, all each of the process described above may completed automatically or automatedly. For example, a workpiece-layout system may receive a graphical representation of a temporary support frame automatedly. Continuing with this example, a workpiece-layout system may select a temporary support frame from a temporary support frame library automatically as a function of a plurality of objects. Still with reference to the continuing example, a plurality of objects may be interrogated for attributes. Attributes may include geometric data and manufacturing data such as the tolerances, material used, finishes and other common manufacturing characteristics. Those of ordinary skill in the art, after reading this disclosure in its entirety will readily appreciate the various interrogatable attributes. Continuing with the same exemplary embodiment, and as a function of attributes of a plurality of objects a workpiece-layout system may automatically select a graphical representation of a temporary support frame, which may be automatically or automatedly received by the workpiece-layout system.

At step 215, the workpiece-layout system receives a selection of graphical representations of the plurality of objects to be machined from the workpiece. The workpiece-layout system may receive the selection in any of a variety of ways, including ways that are the same as or similar to ways known in conventional CAD software, such as SOLIDWORKS® CAD software, available from Dassault Systèmes Americas, Waltham, Mass., among others. Examples of ways of receiving a selection of graphical representations of a plurality of objects to be machined include, but are not limited to, receiving an identification of one or more computer-model files in an onscreen dialog box, dragging and dropping one or more graphical representations from one onscreen window to another onscreen window that contains or will contain the representation of the temporary support frame, copying and pasting one or more graphical representations from one onscreen window to another onscreen window that contains or will contain the representation of the temporary support frame, and any combination of these ways. In some embodiments, the selected graphical representations of the objects to be machined may be displayed on the graphical display along with the graphical representation of the temporary support frame.

At step 220, the workpiece-layout system locates the graphical representations of the plurality of objects in an opening of the graphical representation of the temporary support frame so that they are spaced from one another and from adjacent portions of the temporary support frame by one or more minimum distances that permits machining away material from in between immediately adjacent ones of the objects themselves and between various ones of the objects and the temporary support frame. Generally, the locating of the graphical representations that occurs at step 220 typically results in the clustering of the graphical representations of the objects within the opening of the graphical representation of the temporary support frame into one or more clusters that leave one or more unoccupied regions. Depending on the size and/or number of graphical representations of the objects, the size of the unoccupied region(s) can be to varying extents, including large extents, greater than the minimum regions that would need to be machined away to define and separate the objects during machining. Consequently, the machining away of the material in such excess unoccupied region(s) that would occur in the normal course, i.e., without intervention to minimize such machining, can significantly increase the time needed to machine the objects and temporary support frame from the body of material, as well as increase wear on the machining tools. In addition, depending on the sizes and/or shapes of the graphical representations of the objects, one or more excess unoccupied regions can occur between or among a set of graphical representations of objects. As a simple example, of the most efficient locations of a graphical representations of a U-shaped object and a bar-shaped object is such that the bar-shaped graphical representation extends along the open end of the U-shaped graphical representation, there can be a significantly sized excess unoccupied region among the legs of the U-shape and the bar. To save time, money, and wear on machining tools, eliminating or significantly reducing machining in these excess unoccupied regions is needed. In some cases today, the machining of excess unoccupied regions can be over 50% of the total machine time.

The locating of the graphical representations of the objects at step 220 may be performed in any one or more of a variety of manners. For example, when the graphical representations of the objects may be received along with the graphical representation of the temporary support frame and the workpiece-layout system is so configured, the locating may be in response to a user's onscreen manipulation of those graphical representations, such as by dragging and dropping, snapping the representations to grid or other points, and keying in coordinates for reference points, among others or locating may occur automatically or automatedly. In another example, the workpiece-layout system may include a set of software instructions designed and configured to automatically perform the locating at step 220. For instance, and as described in more detail below relative to a detailed example, the SOLIDWORKS® CAD software mentioned above has a nesting feature that automatically nests, or locates, a plurality of graphical representations relative to one another in a manner that optimizes clustering of the objects to varying extents, depending on the shapes of the graphical representations and the nesting options selected.

At step 225, the workpiece-layout system receives an identification of one or more excess unoccupied regions within the opening of the graphical representation of the temporary support frame. The workpiece-layout system's receipt of the identification of each excess unoccupied region at step 225 can be effected in any of a variety of ways. For example, the receipt of the identification can occur via a user identifying each excess unoccupied region in any of a variety of ways. For example, a user may identify an excess unoccupied region by adding a graphical representation of an occupying structure to that excess unoccupied region. As described below in more detail, such an occupying structure is generally treated like an object to be formed from the multi-object workpiece in that it will not be machined away, but rather it will be formed from the workpiece during the machining process that forms the objects that are the desired end-products of the machining. As those skilled in the art will readily appreciate, by replacing an excess unoccupied region of a workpiece with an occupying structure and essentially treating the occupying structure like an end-product object, machining time and effort can be reduced because the workpiece material in the excess unoccupied region that would in the normal course be machined away based on a conventional CAM model of the objects and temporary support frame no longer will be machined away by virtue of the occupying structure.

As another example of receiving an identification of one or more excess unoccupied regions at step 225, in, for example, a screen view looking in a direction perpendicular to the plane of the graphical representation of the temporary support frame, the user may "click" at a location within an excess unoccupied region to identify it. As yet another example, the user may make a selection, such as in a pop-up window or other user-control interface, that instructs the workpiece-layout system to identify each excess unoccupied region using, for example, automated excess unoccupied region identification algorithms. Such automated excess unoccupied region identification algorithms may be designed and configured to account for certain variables, such as the size(s) of the machining tool(s) that will be used during the machining of the workpiece to create the individual objects and temporary support frame. In some embodiments, the automated excess unoccupied region identification algorithms may be programmed, for example, by user selection or other identification, of a minimum size for an excess unoccupied region below which the workpiece layout system ignores an excess unoccupied region. For example, if a particular excess unoccupied region has any dimension less than the diameter of the milling tool used to define the objects and temporary support frame, then the workpiece layout system will ignore it and let it be treated as a region to be machined away during machining.

At step 230, the workpiece-layout system generates a graphical representation of an occupying structure occupying a corresponding one of the excess unoccupied regions identified in connection with step 225. Depending on the mode of operation, the workpiece-layout system can generate the graphical representation of each occupying structure in any one or more of a number of manners. For example, in a manual mode, a user can create the graphical representation of the occupying structure using any suitable entity-creation and/or manipulation function(s) of the computer modeling, for example, CAD, software being used to view and manipulate the graphical representations of the objects and temporary support frame. Those skilled in the art will readily appreciate the variety of entity creating and/or manipulating functions that a user can use to create a graphical representation for each occupying structure. An example of creating a graphical representation of an occupying structure utilizing specific entity creation and manipulation functions available in SOLIDWORKS® CAD software is presented below.

In some embodiments, the workpiece-layout system includes features and functionality designed and configured specifically for creating occupying structures for multi-object workpieces. Examples of such features and functionality include dialog boxes that allow a user to specify minimum offset(s) between graphical representations of occupying structures and graphical representations of objects to allow for machining, dialog boxes that allow a user to specify automatically created mechanical interlock structures, and a feature that allows a user to select an excess unoccupied region and specify any required variables that allow the workpiece layout system to automatically generate the occupying structure. The minimum offset(s) between graphical representations of occupying structures and graphical representations of objects to allow for machining may be determined based on the minimum relevant dimension of the machining tool(s), such as diameter(s) of milling bit(s), that will be used for machining the objects. For example, when the machining equipment includes an end mill, the offset may be set equal to the diameter of the end mill's bit plus an additional amount for refining operations. In some embodiments, the workpiece-layout system may include occupying-structure-defining algorithms for automatically determining the extents of each occupying structure based on any variable(s) established by a user, such as the machining tool information mentioned above.

In some cases, an occupying structure will result in a modification to the temporary support frame such that the occupying structure is continuous with the temporary support frame. An example of a case in which an occupying structure is part of the temporary support frame is described below in a detailed example. In other cases, an occupying structure will effectively be an island structure, surrounded by one or more of the objects being formed from the workpiece. In some embodiments and as alluded to above, an island-type occupying structure may be provided with interlock structures.

Figure 3A:
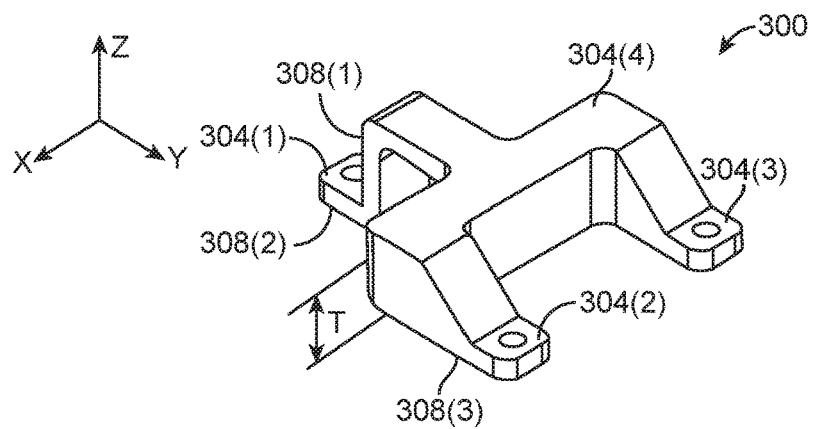
FIG. 3A is an isometric view of an object to be machined from a workpiece, illustrating structural features for which silhouetting can be useful when generating computer models of occupying structures in accordance with the present invention.
Figure 3B:
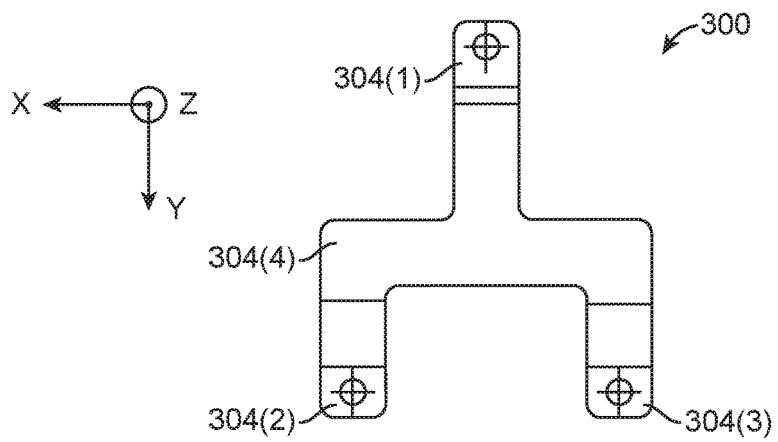
FIG. 3B is a plan view of the object of FIG. 3A showing the extents of the object in the x-y directions.
Figure 3C:
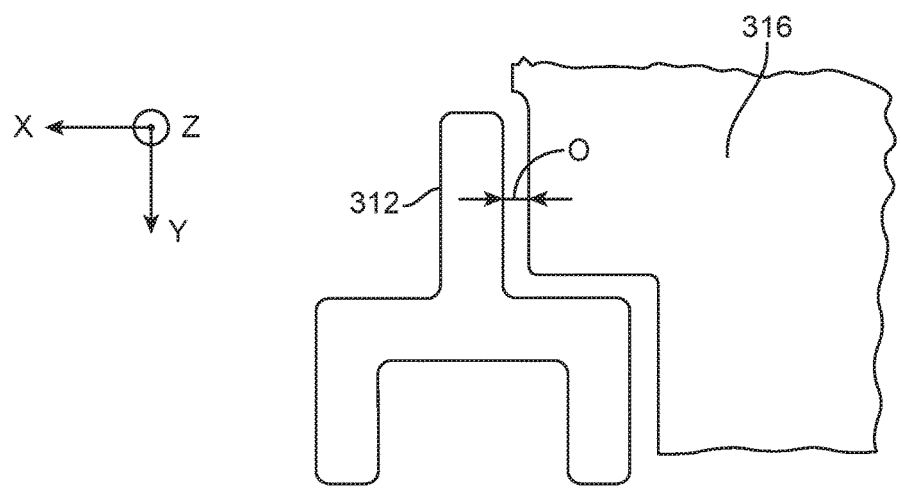
FIG. 3C is a silhouette of the object of FIGS. 3A and 3B that can be used for generating one or more occupying structures around the object and/or locating the object relative to one or more other objects and/or a temporary support frame.

Depending on the configuration of an object to be formed from the multi-object workpiece, certain additional processing may be needed to enable the workpiece-layout system to optimize the shape of each corresponding occupying structure(s) to minimize the amount of machining required. FIGS. 3A to 3C illustrate a silhouetting process that can be used to optimize the shape of each occupying structure adjacent an object having structural features that complicate the process of determining suitable occupying structure(s). In the example of FIGS. 3A to 3C, the object 300 (FIGS. 3A and 3B) has upper-facing (relative to FIG. 3A) surfaces 304(1) to 304(3) that are significantly offset from upper-facing surface 304(4) and has a lower-facing surface 308(1) that is significantly offset from lower-facing surfaces 308(2) and 308(3). When object 300 is machined from a plate-type body of material (not shown) in which the thickness of the plate-type body is parallel to the thickness, T, of the object, automated occupying-structure-defining algorithms would need to account for these vertical (relative to FIG. 3A) offsets. This is so because the algorithms cannot simply use either uppermost surface 304(4) or lowermost surfaces 308(2) and 308(3), since, as those skilled in the art will appreciate, the result would be one or more occupying structures that overlap or underlying one or more portions of object 300. For the sake of convenience and for consistency with usual nomenclature, in the forgoing example of machining of a plate-type body of material, thickness T of object 300 and the thickness of the body are parallel to the z-axis of the machining equipment.

To account for issues that can arise from the fact that the objects to be fabricated are three dimensional and can have offsets along the z-axis of the machining equipment, silhouetting can be used to ensure that each corresponding occupying structure for a given object is properly defined in the graphical model so that the machine-control instructions that the workpiece-layout system ultimately generates are efficient and create the desired occupying structure(s). When an object, such as object 300, is machined using a machine that plunges along the z-axis (e.g., along the direction of thickness of the workpiece), it is desirable to create occupying structures by silhouetting the object as viewed along the z-axis, i.e., plunge axis, to effectively outline the entire x-y region from which the object will be machined. This silhouetting is illustrated in FIGS. 3B and 3C for object 300, wherein in FIG. 3B the object is being viewed along the z-axis (plunge axis) and in FIG. 3C the silhouette 312 of the object along the z-axis (plunge axis) is presented. Once silhouette 312 has been defined, a lateral offset, O, in an x-y plane for any occupying structure, here occupying structure 316, can be set, for example, in the manner indicated above to account for one or more of the machining tools that will be used to machine the workpiece.

Referring to FIG. 2, at step 235, the workpiece-layout system may generate a workpiece computer model including plurality of objects defined in a body of material. Additionally, a machine-control instruction set for machining the workpiece to create the multiple end-product objects desired to be created from the workpiece may be generated and may also be associated with a workpiece computer model. The generated machine-control instruction set contains the instructions for controlling the one or more pieces of numerical control (NC) machining equipment, such as one or more NC milling machines, to perform the machining on the workpiece to create the objects and, as a byproduct of such machining, to create the occupying structure(s) and the temporary support frame, including any version thereof modified by one or more occupying structures as noted above. The generating of the machine-control instruction set accounts for, among other things, 1) the graphical representations of i) the objects, ii) the occupying structure(s) generated at step 230, and iii) the temporary support frame (including any interlock structure(s) and any modifications made thereto to define an occupying structure generated at step 230, 2) the machining equipment, including any particular tool(s), 3) the actual dimensions of the body of material forming the workpiece, 4) any datum(s) provided to properly locate the workpiece relative to the machining equipment, and 5) separate machining steps for forming valleys from an obverse side of the workpiece and for removing interconnecting portions from the reverse side that connect the objects to one another and/or to the temporary support frame and/or the occupying structure(s).

As a simple example in which one single-ended CNC end mill is used for all of the milling on the obverse and reverse sides of the workpiece, the machine-control instruction set includes instructions for directing the cutting tool of the end mill along a first path on the obverse side of the workpiece that forms 1) the valleys that define portions of the openings among the multiple objects that define the objects, inner portion(s) of the temporary support frame, and one or more portions of each occupying structure, 2) the interlock features on the inner periphery of the temporary support frame, including any occupying structure, if any, that modified the starting temporary support frame and on any island-type occupying structure, if any, and 3) any cavity or other surface feature, if any, on any one or more of the objects. Such a machine-control instruction set may also include instructions for directing the cutting tool (or a different cutting tool) of the end mill along a second path on the reverse side of the workpiece in which any surfaces and/or surface features on the objects, if any, are machined.

As those skilled in the art will readily appreciate, the machine-control instruction set may be generated as a function of 1) the specific machining tool(s) (e.g., milling bit(s)) that will be used during the machining of the workpiece to create the multiple objects as well as 2) the size of the body of material that becomes the workpiece. It is noted that the specific machining tool(s) have been at least partially accounted for in the process of defining the offsets for the objects and any occupying structures. The size of the workpiece is used to define where the machining equipment will actually be removing material and engaging the workpiece. Other inputs, such as type of material (e.g., to control machining speed), may also be used for generating the machine-control instruction set as needed or desired. The generation of the machine-control instruction set may be performed automatically, such as by intelligent CAM software (e.g., CAMWORKS® software available from Geometric Technologies, Inc., Scottsdale, Ariz.), performed semi-automatically with the assistance of a user (such as when the CAM software does not have intelligence on how to handle certain physical features), or under the complete control of a user.

Figure 4:
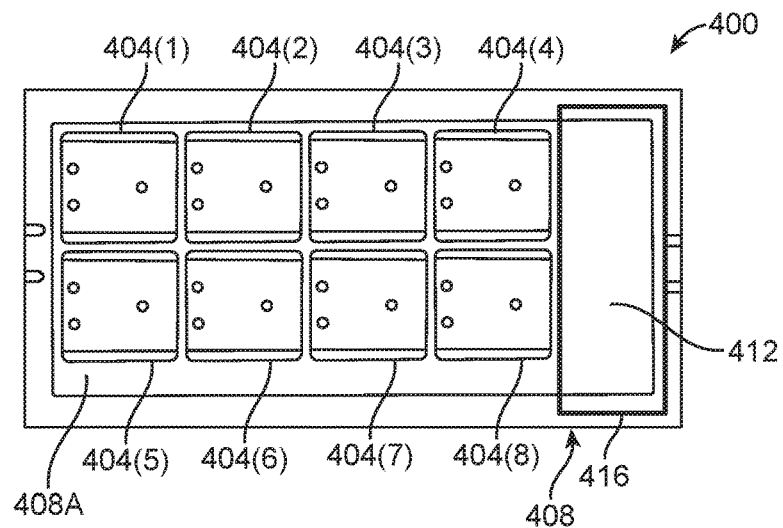
FIG. 4 is a screenshot of a window of CAD software showing a graphical representation of a workpiece computer model for creating eight identical objects from a single body of material, showing the workpiece computer model prior to generating an occupying structure to occupy an excess unoccupied region.

With the foregoing principles and features in mind, FIGS. 4-9 illustrate a simple example of creating a workpiece computer model 400 (illustrated in the figures by graphical representations generated by computer modeling software, such as CAD software) of a workpiece for providing eight identical objects (illustrated in the figures by graphical representations 404(1) to 404(8)) located in an opening of a suitable temporary support frame (illustrated in the figures by graphical representations 408A and 408, respectively). As seen in FIG. 4, the arrangement of object graphical representations 404(1) to 404(8) within opening 408A results in a relatively large unoccupied region 412 (highlighted by box 416) that would require a relatively large amount of machining to create the actual workpiece. Consequently, this example is directed to generating a graphical representation 900 (FIG. 9) of an occupying structure that, in this example, can be characterized as an extension of a portion of graphical representation 408 of the temporary support frame.

Figure 5:
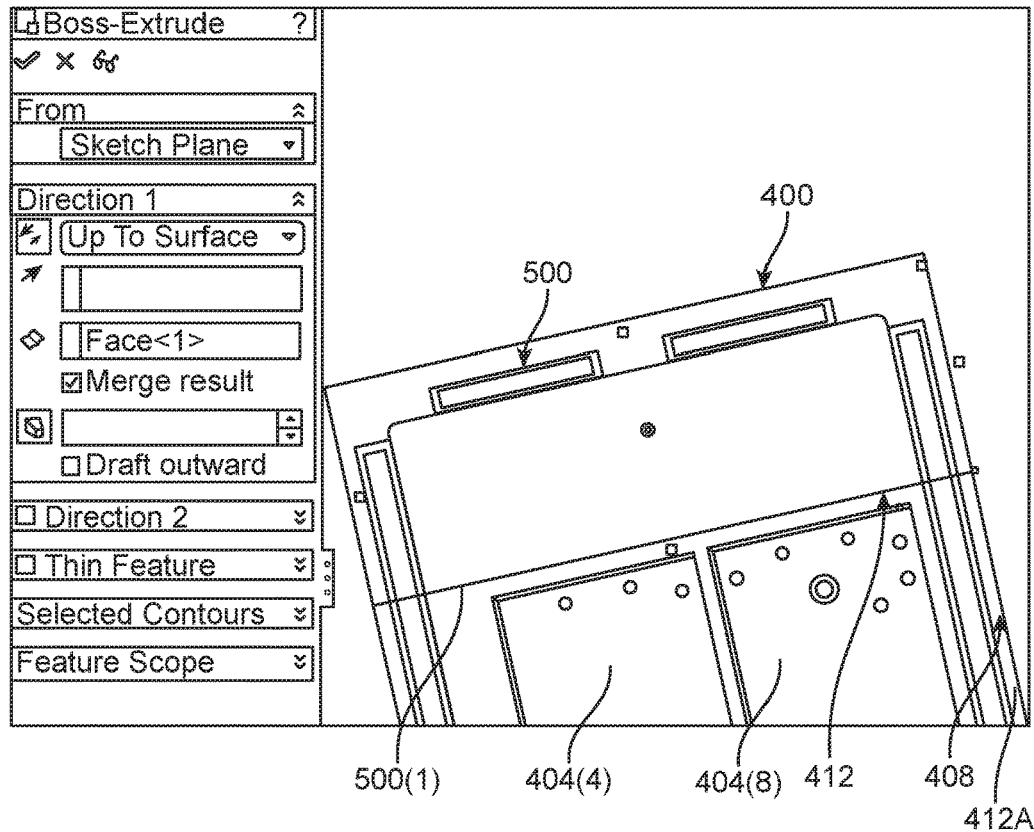
FIG. 5 is a screenshot of the window of FIG. 4 illustrating the manual addition of adding a graphical representation of an occupying structure to the workpiece computer model of FIG. 4 using an entity extrusion process.
Figure 6:
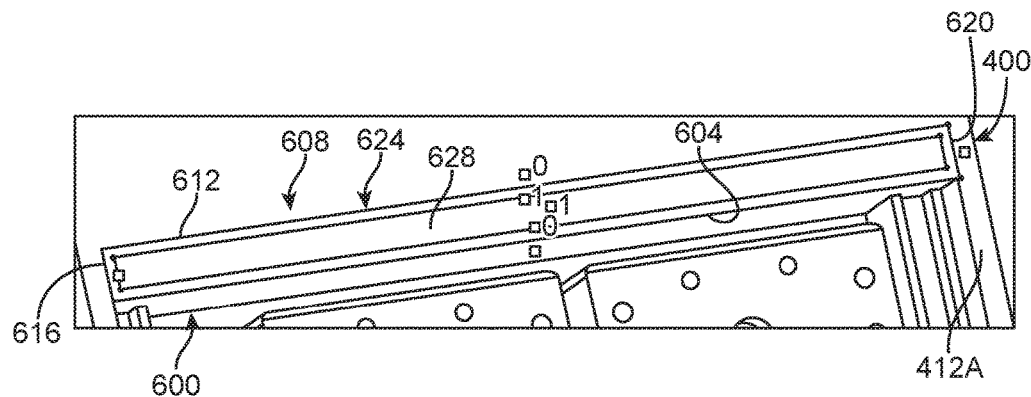
FIG. 6 is a screenshot of the window of FIG. 4 illustrating certain steps of defining a graphical representation of a new channel of the workpiece.

Referring to FIG. 5, a first step of generating graphical representation 900 (FIG. 9) of occupying structure within the modeling software may be to use a suitable sketch function of the modeling software to make a sketch 500 of a rectangle on the back face (relative to FIG. 5) of graphical representation 408 of temporary support frame that connects the three portions of the graphical representation of temporary support frame bordering unoccupied region 412. In the present example, the offset between objects 404(4) and 404(8) and occupying structure 900 (FIG. 9) is 0.28" to accommodate ¼-inch milling bit plus a machining offset. Consequently, the edge 500(1) of rectangle sketch 500 is located 0.28" away from the edges of objects 404(4) and 404(8) closest to the rectangle sketch. Next, the rectangle sketch 500 is extruded using a suitable function of the modeling software to the upper face 412A of temporary support frame 412 to define a solid rectangular prism entity 600 (FIG. 6). Such sketching and extrusion operations are well known in the art as are other software modeling functions described below.

Next, as illustrated in FIG. 6, edge 600(1) of rectangular prism entity 600 is converted to a line 604 on upper face 412A to allow for creating a new sketch 608 for defining features of graphical representations 904 and 908 (FIG. 9) of, respectively, a shelf and a channel. After creating line 604, an offset line 612 on upper face 412A is created at an offset of 0.5", which is the width of the shelf containing the channel. This offset can be created using any suitable function(s) available in the modeling software, such as an offset line function. After creating line 612, lines 616 and 620 connecting lines 604 and 612 can be created to form a first rectangle 624. Next, a second rectangle 628 can be formed at an offset of 0.1", for example, using an offset function available in the modeling software.

Figure 7:
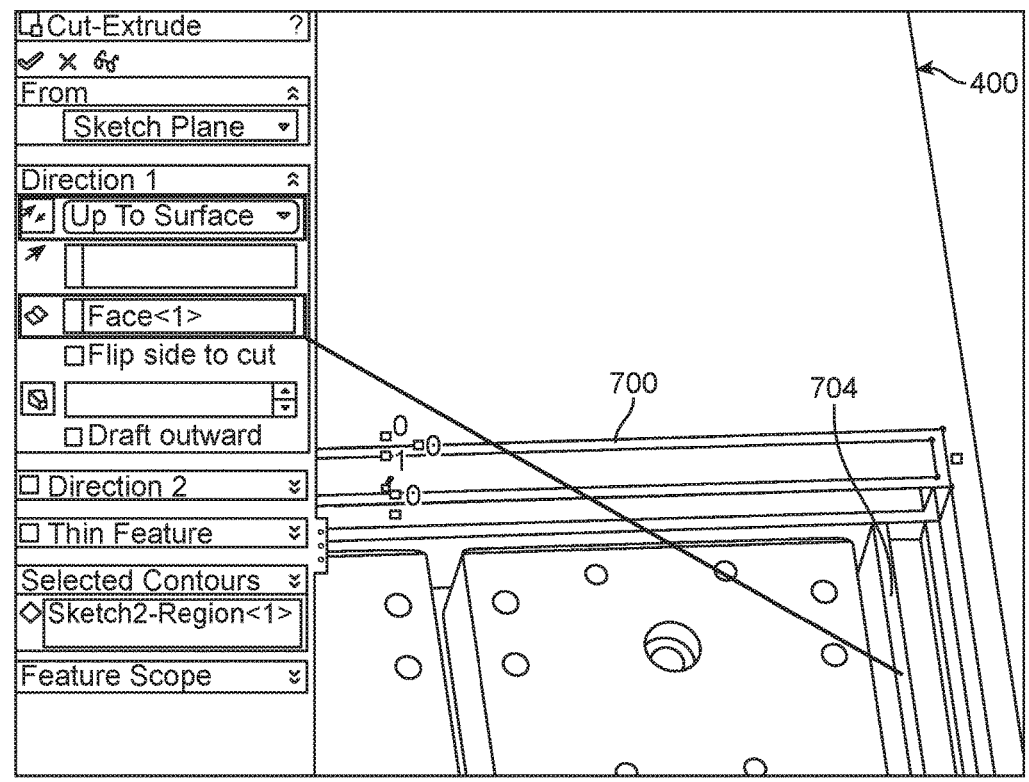
FIG. 7 is a screenshot of the window of FIG. 4 illustrating additional steps of defining the graphical representation of the new channel.
Figure 8:
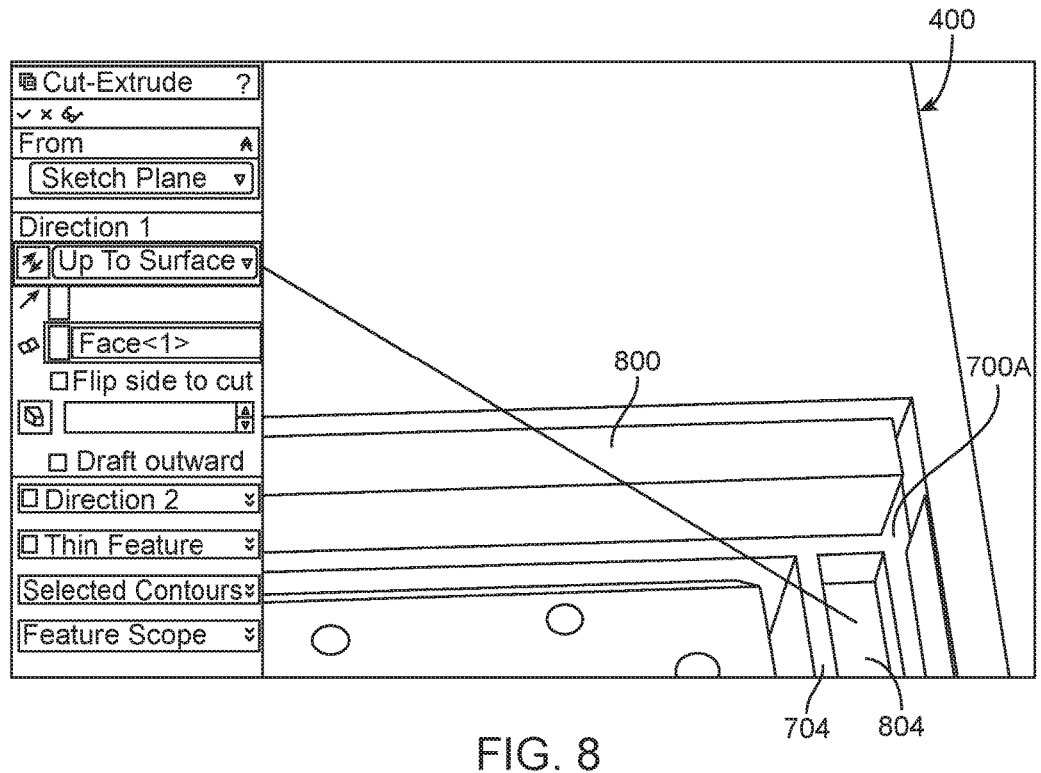
FIG. 8 is a screenshot of the window of FIG. 4 illustrating further steps of defining the graphical representation of the new channel.
Figure 9:
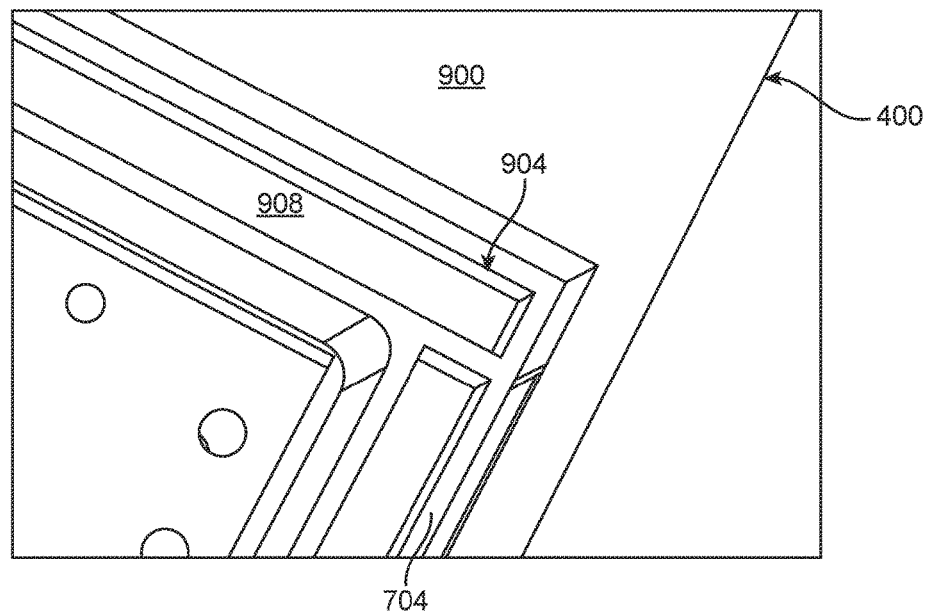
FIG. 9 is a screenshot of the window of FIG. 4 illustrating the finished graphical representation of the new channel.

Next, as illustrated in FIG. 7, a rectangular tubular extrusion 700 can be extruded to the bottom face of graphical representation 412 of the temporary support frame using a suitable extrusion function of the modeling software, and the z-axis location of upper end 700A of the tubular extrusion can be set, for example, using a suitable locating function (such as the illustrated "Up To Surface" function) of the modeling software and referencing a surface at the same z-axis location, such as surface 704. The result of locating upper end 700A of tubular extrusion 700 at the same location of surface 704 is illustrated in FIGS. 8 and 9. Next, graphical representation 904 (FIG. 9) of the channel can be formed by performing a similar upper end locating operation on rectangular extrusion 800 (FIG. 8) and selecting surface 804 as the reference surface, and then specifying that all vertical corners of the depression 908 (FIG. 9) created by this step have a radius of 0.15". The result of all of these operations are illustrated in FIG. 9, in which it is seen that the graphical representation 900 of the occupying structure is now configured like the graphical representation 412 of the rest of the temporary support frame relative to the channels and excess area 412 is now part of the frame.

Figure 10:
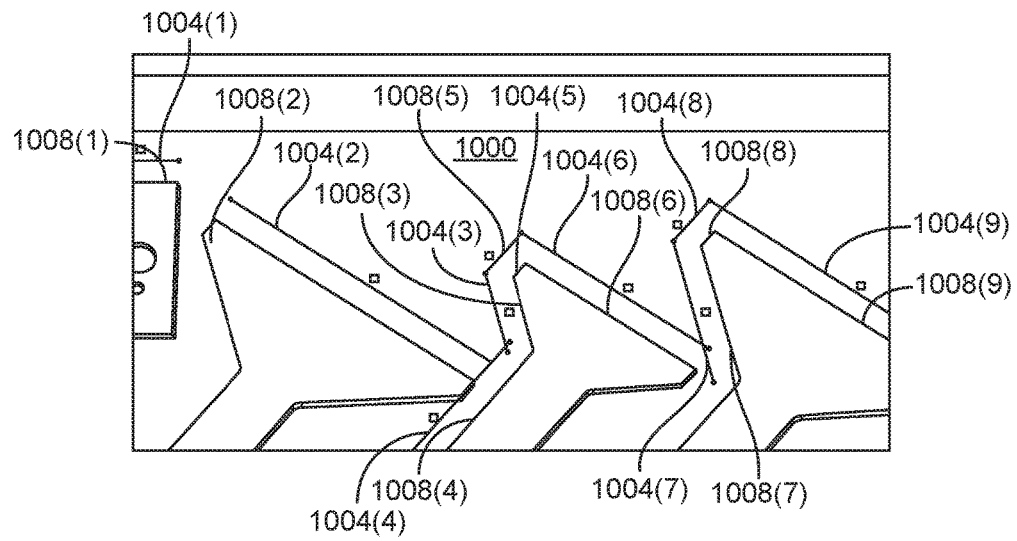
FIG. 10 is a screenshot of a window of CAD software illustrating creating workpiece computer model using a process of defining a graphical representation of an occupying structure manually using offsets.
Figure 11:
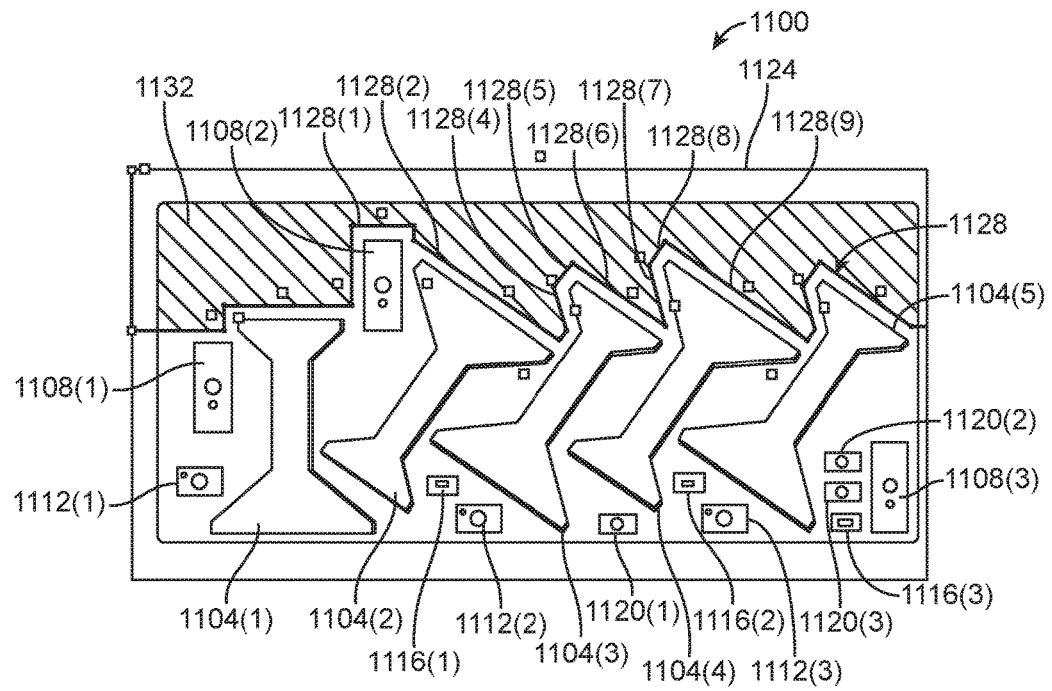
FIG. 11 is a screenshot of the window of FIG. 11 showing the graphical representation of the occupying structure defined using offsets.

FIGS. 10 and 11 illustrate initial steps in defining a graphical representation (not shown) of an occupying structure for occupying an excess unoccupied region 1000 (FIG. 10) within a workpiece computer model 1100 (FIG. 11) that includes graphical representations 1104(1) to 1104(5), 1108(1) to 1108(3), 1112(1) to 1112(3), 1116(1) to 1116(3), 1120, and 1124 (FIG. 11), respectively, of 1) five differing types of objects to be made from the modeled workpiece and 2) a temporary support frame. As seen in FIG. 10, a line-offset function available in the modeling software allows a user to draw lines, such as lines 1004(1) to 1004(9), that are offset by a set distance, here 0.28", from corresponding edges 1008(1) to 1008(9) of graphical representations 1108(2) and 1104(2) to 1104(4). As seen in FIG. 11, lines 1004(1) to 1004(9) and similar lines 1128(1) to 1128(9) can then be joined, along with similar lines (unlabeled), to define a continuous line 1128 that can then be used in a process to create a graphical representation (not shown, but would occupy hatched region 1132) of an occupying structure that occupies excess unoccupied region 1000. The process used to create the graphical representation (not shown) of an occupying structure may be an extrusion process the same as or similar to the extrusion process described above in connection with FIGS. 4-9.

Figure 12:
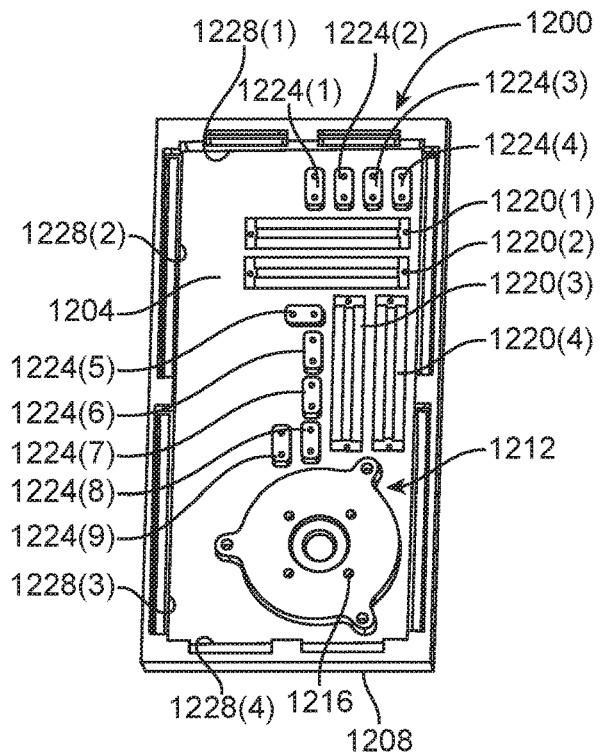
FIG. 12 is an isometric view of a graphical representation of a workpiece computer model for creating fourteen objects of three differing types from a single body of material prior to adding any occupying structure.
Figure 13:
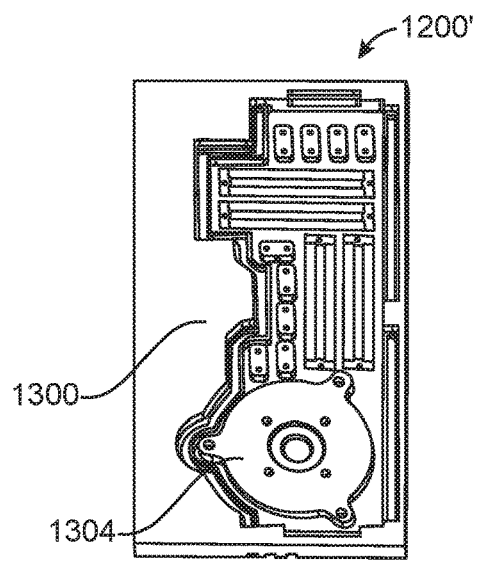
FIG. 13 is an isometric view of the graphical representation of FIG. 12 after modifying the workpiece to include an occupying structure in one of the excess unoccupied regions.

FIGS. 12 and 13 illustrate, respectively, a workpiece computer model 1200 and 1200' before and after adding a graphical representation 1300 (FIG. 13) of an occupying structure to the primary unoccupied region 1204 (FIG. 12) of workpiece computer model 1200, which in this case is between the graphical representation 1208 of the temporary support frame and the cluster 1212 of graphical representations 1216, 1220(1) to 1220(4), and 1224(1) to 1224(9) of three differing types of objects to be made from the workpiece represented by computer model 1200'. In this example, graphical representation 1300 (FIG. 13) of the occupying structure is essentially provided as an extension to the graphical representation 1208 of the temporary support frame. It is seen in FIG. 13 that the graphical representations 1228(1) to 1228(4) of FIG. 12 of channels formed in shelves of the graphical representation 1208 of the temporary support frame are effectively replaced in computer model 1200' (FIG. 13) with a graphical representation 1304 of a single continuous channel formed in a single continuous shelf. Graphical representation 1300 of the occupying structure may have been created automatically or manually, for example, using any of the suitable techniques described above. In addition, the formation of cluster 1212 of graphical representations 1216, 1220(1) to 1220(4), and 1224(1) to 1224(9) of three differing types of objects may have been created automatically or manually, for example, using any of the suitable techniques described above.

Figure 14:
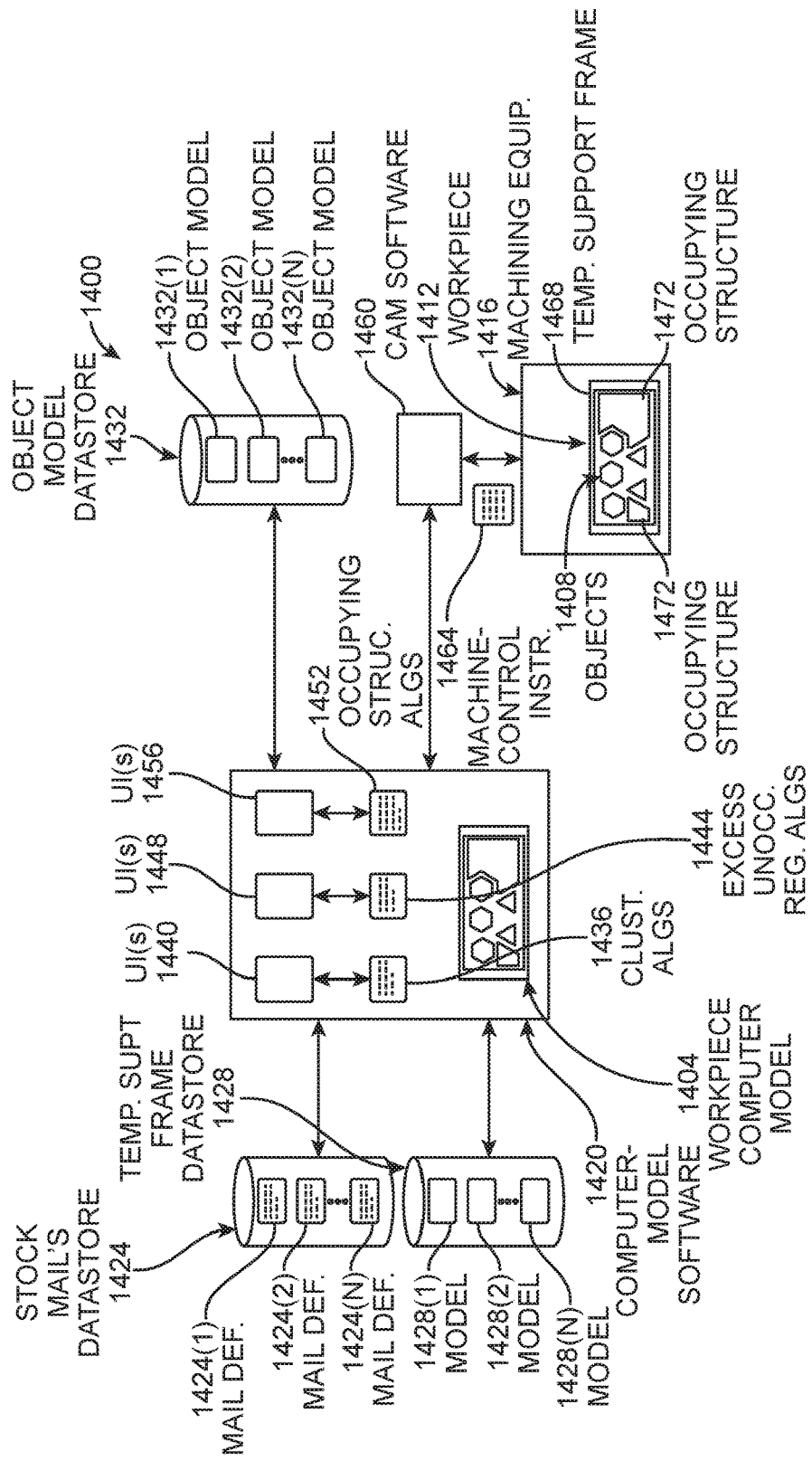
FIG. 14 is a high-level diagram illustrating a workpiece-layout system made in accordance with the present invention.

FIG. 14 illustrates an exemplary workpiece-layout system 1400 that can perform methods of the present disclosure, including method 200 of FIG. 2, to create a workpiece computer model 1404 for automatically machining a plurality of objects 1408 from a single workpiece 1412 using one or more pieces of machining equipment 1416. In this example, workpiece-layout system 1400 includes computer-modeling software 1420, such as CAD software, that allows a user to create, build, modify, etc., computer models of various structures via graphical representations displayed to use on one or more graphical displays and manipulated by the user using one or more computer input devices. An example of such software that can be part of computer-modeling software 1420 is SOLIDWORKS® CAD software, but any of many others, can be used to provide three-dimensional (3D) modeling functionality. In some embodiments, a user can use computer-modeling software 1420, for example, in a manner described above, to create workpiece computer model 1404 "manually," i.e., using conventional drawing commands native to commercial off-the-shelf (COTS) computer modeling software. In some embodiments, computer-modeling software 1420 can include COTS CAD software that is augmented with custom software, such as via one or more plugin software modules, that automates and/or otherwise assists the user in efficiently building a workpiece computer model, such as workpiece computer model 1404. In some embodiments, computer-modeling software 1420 can be entirely custom software built for the specific task of building workpiece computer models, such as workpiece computer model 1404. Generally, the form of computer-modeling software 1420 can be any suitable form that provides the requisite functionality.

Following are examples of customization that can be provided to computer-modeling software 1420, for example, via one or more plugin modules and/or direct integration, and to workpiece-layout system 1400 more generally, to enhance the user experience and/or increase the speed and ease of creating workpiece computer models, such as workpiece computer model 1404. In some embodiments, for example, where a fabricator frequently makes an object from a variety of stock bodies of material (e.g., sheets or slabs of stainless steel, aluminum, etc.), workpiece-layout system 1400 may include a stock-materials datastore 1424 and a corresponding stock-frames datastore 1428 that contain, respectively, stock-material definitions 1424(1) to 1424(N) (e.g., sizes, material type, etc.) of bodies of material typically used and preconfigured frame computer models 1428(1) to 1428(N) of temporary support frames suitable for use with corresponding respective stock bodies of material. In this connection, computer-modeling software 1420 may include a user interface (UI) designed and configured to allow a user to select a desired one of stock-material definitions 1424(1) to 1424(N) and/or a desired one of preconfigured frame computer models 1428(1) to 1428(N) for use in creating a particular workpiece computer model. When stock-materials datastore 1424 and/or stock-frames datastore 1428 are not provided, a user can import them into workpiece-layout system 1400 as needed or create them as needed, for example, using computer-modeling software 1400. Relatedly, workpiece-layout system 1400 may also include an object-model datastore 1432 that stores computer models 1432(1) to 1432(N) of objects to be made from workpieces modeled using the workpiece-layout system. In the absence of object-model datastore 1432, computer models of objects to be made can be stored elsewhere and imported into workpiece-layout system 1400 when needed and/or created using computer-modeling software 1420.

As mentioned above in connection with method 200, computer-modeling software made in accordance with the present invention, such as computer-modeling software of FIG. 14, may include clustering algorithms 1436 designed and configure to automatically cluster the object models within a selected temporary support frame in a manner that minimizes the amount of machining that needs to be performed, for example, by maximizing consolidation of the excess unoccupied regions into as few relatively large excess unoccupied regions as possible, to create the objects from the workpiece modeled using workpiece-layout system 1400. Computer-modeling software 1420 may also include any suitable UI(s) 1440 that allow a user to implement clustering algorithms 1436.

As also mentioned above, computer-modeling software made in accordance with the present invention, such as computer-modeling software of FIG. 14, may include excess unoccupied region identification algorithms 1444 for automatically identifying any excess unoccupied regions within a workpiece computer model that may each be suitable for receiving a computer model of a corresponding occupying structure that does not get machined away during machining of the modeled workpiece. Correspondingly, computer-modeling software 1420 may include one or more UIs 1448 that allow a user to input any information needed to allow excess unoccupied region identification algorithms 1444 to function properly. Exemplary details of functionalities and inputs that can be involved with excess unoccupied region identification algorithms 1444 are described above in connection with step 225 of method 200 of FIG. 2.

As also described above, computer-modeling software of the present invention, such as computer-modeling software 1420 may also include occupying-structure-defining algorithms 1452 for automatically defining computer models for the occupying structures that do not get machined away during machining of the modeled workpiece. Computer-modeling software 1420 may also include one or more UIs 1456 that allow a user to input any information needed to allow occupying-structure-defining algorithms 1452 to function properly. Exemplary details of functionalities and inputs that can be involved with occupying-structure-defining algorithms 1452 are described above in connection with step 230 of method 200 of FIG. 2 Algorithms 1436, 1444, and 1452 and any corresponding functionalities and UIs, such as UIs 1440, 1448, and 1456, may be implemented, for example, via one or more plugin modules or implemented within a core of the computer-modeling software itself. As those skilled in the art will readily appreciate, these and other customizations could be made to an extent that the only inputs needed are an indication of the computer models of the objects to be machined and an instruction to create the workpiece-computer model, and perhaps an indication of the material from which the objects are to be made if workpiece-layout system 1400 is being used to create workpiece computer models for differing materials.

Workpiece layout system 1400 may further include CAM software 1460 designed and configured to generate, for each workpiece computer model 1404, a machine-control instruction set 1464 that controls machining equipment 1416 during the machining of workpiece 1412 to create plurality of objects 1408 therefrom, as well as to create the temporary support frame 1468 and any occupying structure(s) 1472 that are generally remnants of the machining. CAM software 1460 may include COTS CAM software, such as CAMWORKS®, CAM software, or any other suitable software that can utilize workpiece computer model 1404 to generate machine-control instruction set 1464, for example, in the manner described above in connection with step 235 of method 200 of FIG. 2.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 15:
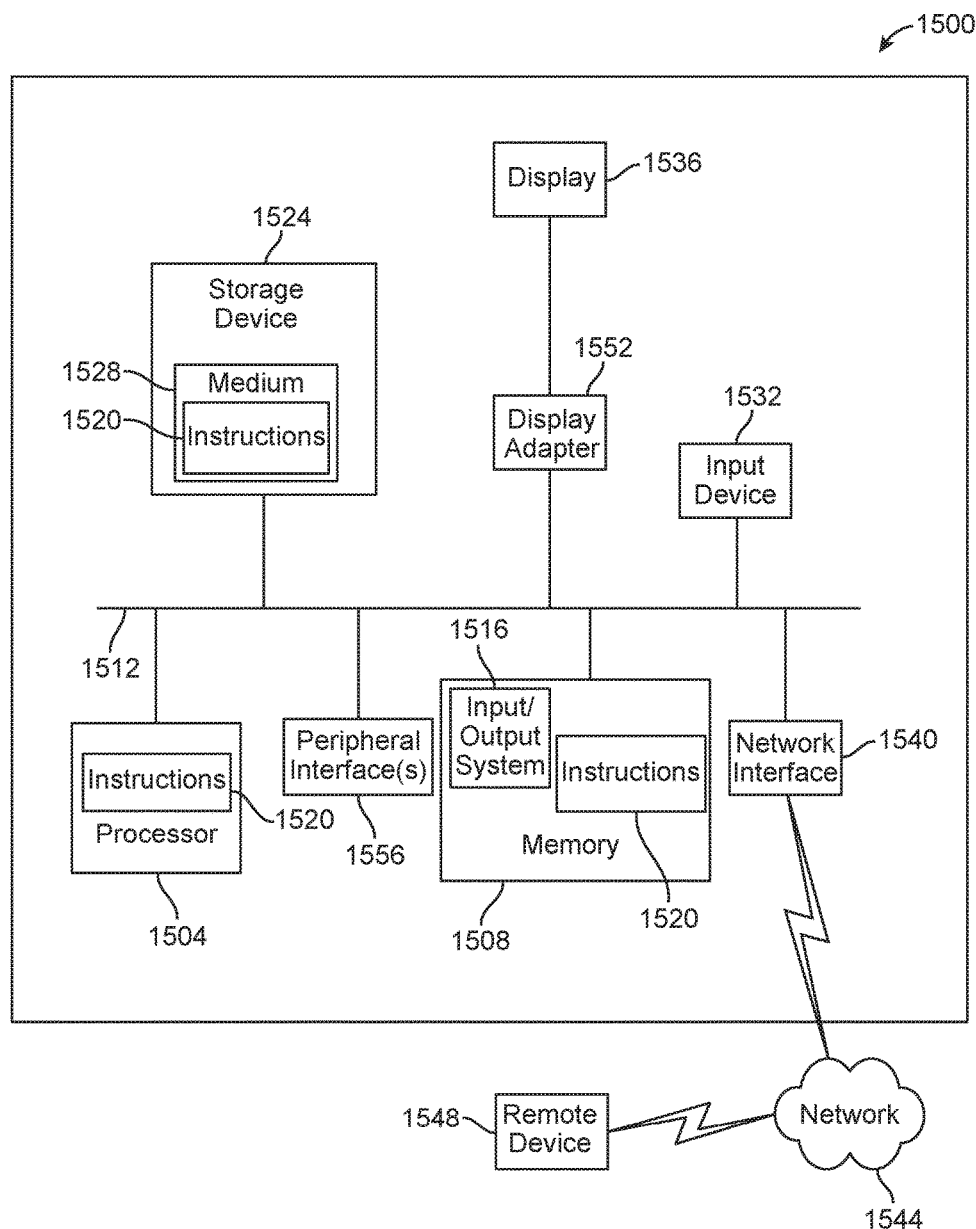
FIG. 15 is a high-level diagram illustrating a computing system suitable for use in implementing any one or more parts of a workpiece-layout system of the present disclosure, including the workpiece-layout system of FIG. 14 and steps of the method of FIG. 2.

FIG. 15 shows a diagrammatic representation of one embodiment of a computing device in the exemplary form of a computer system 1500 within which a set of instructions for causing a control system, such as the workpiece-layout system 1400 of FIG. 14, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure; for example, workpiece-layout system 1400, computer-modeling software 1420, CAM software 1460, and/or any user interfaces such as UIs 1440, 1448, and 1456, may be executed using a single device or any number of devices. Computer system 1500 includes a processor 1504 and a memory 1508 that communicate with each other, and with other components, via a bus 1512. Bus 1512 may include any of several types of bus structures including, but not limited to, a memory bus, a memory controller, a peripheral bus, a local bus, and any combinations thereof, using any of a variety of bus architectures.

Memory 1508 may include various components (e.g., machine-readable media) including, but not limited to, a random access memory component, a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable media) instructions (e.g., software) 1520 embodying any one or more of the aspects and/or methodologies of the present disclosure, such as one or more aspects of FIGS. 1-5. In another example, memory 1508 may further include any number of program modules including, but not limited to, an operating system, one or more application programs, other program modules, program data, and any combinations thereof.

Computer system 1500 may also include a storage device 1524, which may be used to implement datastores 1424, 1428, and 1432, among other aspects of the present disclosure. Examples of a storage device (e.g., storage device 1524) include, but are not limited to, a hard disk drive, a magnetic disk drive, an optical disc drive in combination with an optical medium, a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), IEEE 1194 (FIREWIRE), and any combinations thereof. In one example, storage device 1524 (or one or more components thereof) may be removably interfaced with computer system 1500 (e.g., via an external port connector, not shown). Particularly, storage device 1524 and an associated machine-readable medium 1528 may provide nonvolatile and/or volatile storage of machine-readable instructions, data structures, program modules, and/or other data for computer system 1500, which in some implementations and embodiments may transform at least part of the computer system into an electronic pricing machine, as described hereinabove. In one example, software 1520 may reside, completely or partially, within machine-readable medium 1528. In another example, software 1520 may reside, completely or partially, within processor 1504.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof, among others. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. For example, a user may provide inputs to workpiece-layout system 1400 simply by connecting an appropriately configured device to an appropriate network. A network interface device, such as network interface device 1540, may be utilized for connecting computer system 1500 to one or more of a variety of networks, such as network 1544, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1544, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image, such as one or more prices and/or lists of suppliers, to a display device, such as display device 1536. Examples of a display device include, but are not limited to, a liquid crystal display (LCD), a cathode ray tube (CRT), a plasma display, a light emitting diode (LED) display, and any combinations thereof. Display adapter 1552 and display device 1536 may be utilized in combination with processor 1504 to provide graphical representations of aspects of the present disclosure. In addition to a display device, computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of providing a workpiece computer model including a plurality of objects defined in a body of material, the method comprising:
  receiving, a graphical representation of a temporary support frame to be machined from the body of material, wherein the graphical representation of the temporary support frame includes:
    first and second surfaces spaced from one another; and
    an opening for receiving graphical representations of computer models of the plurality of objects, the opening extending from the first side to the second side;
  receiving a selection of the graphical representations of the plurality of objects to be machined from the workpiece;
  locating the graphical representations of the plurality of objects in the opening so that the graphical representations of the plurality of objects are spaced from one another and from the graphical representation of the temporary support frame so as to permit machining of the plurality of objects;
  receiving an identification of one or more excess unoccupied regions within the opening after the locating of the graphical representations of the plurality of objects;
  for each excess unoccupied region, generating a graphical representation of an occupying structure occupying at least one of the one or more excess unoccupied regions; and
  generating a workpiece computer model including a plurality of objects defined in a body of material, wherein the workpiece computer model further comprises information for generating a machine control instruction set for controlling machining equipment to machine the plurality of objects into discrete objects so that when machining operations on the body of material are done, each occupying structure substantially remains as a remnant of the machining.

2. The method according to claim 1, wherein the locating of the graphical representations of the plurality of objects in the opening includes executing automated-nesting algorithms that automatically locate the graphical representations of the plurality of objects within the opening in a manner that consolidates excess unoccupied regions into a smaller number of larger unoccupied regions.

3. The method according to claim 1, wherein the locating of the graphical representations of the plurality of objects in the opening includes clustering the graphical representation of the plurality of objects into a cluster in one region of the opening so as to create an excess unoccupied region partially bordered by the temporary support frame and partially bordered by the cluster.

4. The method according to claim 3, wherein the generating of a graphical representation of an occupying structure for the excess unoccupied region partially bordered by the temporary support frame and partially bordered by the cluster includes generating a graphical representation that moves a portion of an inner perimeter of the graphical representation of the temporary support frame proximate to the cluster.

5. The method according to claim 1, wherein:
the receiving of an identification of one or more excess unoccupied regions includes receiving an identification of an island region surrounded by ones of the graphical representations of the plurality of objects; and
the generating of a graphical representation of an occupying structure includes generating a graphical representation of an island structure.

6. The method according to claim 1, wherein the receiving of an identification of one or more unoccupied regions includes receiving inputs from the user that create an occupying structure in one of the one or more excess unoccupied regions.

7. The method according to claim 6, wherein the receiving of inputs includes receiving inputs that extends a portion of the graphical representation of the temporary support frame toward a cluster of the graphical representations of the plurality of objects within the opening.

8. The method according to claim 6, wherein the receiving of inputs includes receiving inputs that create an island structure surrounded by ones of the graphical representations of the plurality of objects.

9. The method according to claim 1, further comprising executing automated excess unoccupied region identification algorithms, wherein the receiving of an identification of one or more excess unoccupied regions includes receiving an identification of one or more excess unoccupied regions from the executing of the automated excess unoccupied region identification algorithms.

10. The method according to claim 1, wherein generating a graphical representation of an occupying structure includes executing automated occupying structure generating algorithms that generate the graphical representation of the occupying structure.

11. The method according to claim 1, wherein the graphical representation of the temporary support frame includes interlock features.

12. The method according to claim 11, wherein the generating of a graphical representation of an occupying structure includes generating a graphical representation of an occupying structure that includes a graphical representation of at least one interlock feature.

13. The method according to claim 12, wherein the locating of the graphical representations of the plurality of objects in the opening includes clustering the graphical representation of the plurality of objects into a cluster in one region of the opening so as to create an excess unoccupied region partially bordered by the temporary support frame and partially bordered by the cluster.

14. The method according to claim 12, wherein the locating of the graphical representations of the plurality of objects in the opening includes clustering the graphical representation of the plurality of objects into a cluster in one region of the opening so as to create an excess unoccupied region partially bordered by the temporary support frame and partially bordered by the cluster.

15. The method according to claim 14, wherein the graphical representation of at least one interlock feature is included on the portion of the inner perimeter of the graphical representation of the temporary support frame proximate to the cluster.

16. The method according to claim 1, further comprising receiving a selection of the graphical representation of the temporary support frame from a set of predefined graphical representations of differing temporary support frames.

17. The method according to claim 16, wherein the receiving of a selection of the graphical representation of the temporary support frame includes receiving a user selection of the graphical representation of the temporary support frame.

18. The method according to claim 17, further comprising displaying a plurality of the predefined graphical representations of differing temporary support frames in the set of the predefined graphical representations of differing temporary support frames in a manner that allows a user to select a desired one of the displayed plurality of predefined graphical representations of differing temporary support frames.

19. The method according to claim 16, wherein the receiving of a selection of the graphical representation of the temporary support frame includes receiving the selection based on a selection of a particular piece of stock material.

* * * * *